United States Patent
Ikeda et al.

(10) Patent No.: US 12,443,376 B2
(45) Date of Patent: Oct. 14, 2025

(54) IMAGE PROCESSING DEVICE, PROCESSING METHOD, AND NON-TRANSITORY COMPUTER-READABLE STORAGE MEDIUM

(71) Applicant: SEIKO EPSON CORPORATION, Tokyo (JP)

(72) Inventors: Ryo Ikeda, Matsumoto (JP); Norito Sugawara, Matsumoto (JP); Mark Heinrichs, Watford (GB)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/346,997

(22) Filed: Jul. 5, 2023

(65) Prior Publication Data

US 2024/0012592 A1    Jan. 11, 2024

(30) Foreign Application Priority Data

Jul. 6, 2022  (JP) .................................. 2022-108849

(51) Int. Cl.
*G06F 3/12* (2006.01)
*H04W 76/10* (2018.01)

(52) U.S. Cl.
CPC .......... *G06F 3/1236* (2013.01); *G06F 3/1203* (2013.01); *G06F 3/1292* (2013.01); *H04W 76/10* (2018.02)

(58) Field of Classification Search
CPC .... G06F 3/1236; G06F 3/1203; G06F 3/1292; G06F 3/12; H04W 76/10
See application file for complete search history.

(56) References Cited

U.S. PATENT DOCUMENTS

| | | | | |
|---|---|---|---|---|
| 2012/0322368 A1* | 12/2012 | Desai | ................... | H04W 12/50 709/204 |
| 2013/0103824 A1* | 4/2013 | Sugaya | ................... | H04L 41/12 709/224 |
| 2017/0026834 A1* | 1/2017 | Nakajima | ............... | H04W 4/80 |
| 2017/0034768 A1* | 2/2017 | Kimura | ................... | H04L 67/14 |
| 2017/0132499 A1* | 5/2017 | Yamamoto | .......... | G06K 15/022 |
| 2017/0308338 A1* | 10/2017 | Maeda | ................. | G06F 3/1292 |
| 2019/0012117 A1* | 1/2019 | Zhao | ................... | H04N 1/32122 |
| 2023/0276241 A1* | 8/2023 | Shibata | ................. | H04W 12/50 455/411 |

FOREIGN PATENT DOCUMENTS

| | | | | | |
|---|---|---|---|---|---|
| CN | 104657201 A | * | 5/2015 | ............... | G06F 8/60 |
| EP | 3425894 A1 | * | 1/2019 | ........... | G06F 3/1204 |
| JP | 2012218223 A | | 11/2012 | | |
| TW | 201541897 A | * | 11/2015 | | |

* cited by examiner

*Primary Examiner* — Huo Long Chen
(74) *Attorney, Agent, or Firm* — CHIP LAW GROUP

(57) ABSTRACT

An image processing device includes a communication unit that performs a wireless connection with a terminal device and a processing unit that generates a two-dimensional code including address information that specifies a network setting page used for performing network setting with the image processing device. When the communication unit establishes a wireless connection with the terminal device, the processing unit performs processing of outputting the generated two-dimensional code.

11 Claims, 18 Drawing Sheets

IMAGE PROCESSING DEVICE, PROCESSING METHOD, AND NON-TRANSITORY COMPUTER-READABLE STORAGE MEDIUM

The present application is based on, and claims priority from JP Application Serial Number 2022-108849, filed Jul. 6, 2022, the disclosure of which is hereby incorporated by reference herein in its entirety.

BACKGROUND

1. Technical Field

The present disclosure relates to an image processing device, a processing method, a non-transitory computer-readable storage medium storing a program, or the like.

2. Related Art

Conventionally, there are known image processing devices that can be set up for a wireless connection with a terminal device. JP-A-2012-218223 discloses a method in which device information of a printer that is an image processing device is displayed as a two-dimensional code such that a user reads the two-dimensional code with a terminal device.

However, in the JP-A-2012-218223, there is no proposal to effectively use a two-dimensional code output from the image processing device to thus facilitate network setting.

SUMMARY

One aspect of the present disclosure relates to an image processing device including a communication unit that performs a wireless connection with a terminal device and a processing unit that generates a two-dimensional code including address information that specifies a network setting page used for performing network setting with the image processing device, and the processing unit performs, when the communication unit establishes a wireless connection with the terminal device, processing of outputting the generated two-dimensional code.

One aspect of the present disclosure relates to a processing method including processing of performing a wireless connection with a terminal device, processing of generating a two-dimensional code including address information that specifies a network setting page used for performing network setting with an image processing device, and processing of outputting, when a wireless connection with the terminal device is established, the generated two-dimensional code.

One aspect of the present disclosure relates to a non-transitory computer-readable storage medium storing a program that causes a computer to function as a communication unit that performs a wireless connection with a terminal device and a processing unit that generates a two-dimensional code including address information that specifies a network setting page used for performing network setting with an image processing device, and the processing unit performs, when the communication unit establishes a wireless connection with the terminal device, processing of outputting the generated two-dimensional code.

DESCRIPTION OF EXEMPLARY EMBODIMENTS

An embodiment will be described below. Note that the embodiment described below does not unjustly limit the contents of the present disclosure described in the appended claims. In addition, not all configurations described in the embodiment are necessarily essential components of the present disclosure.

Figure 1:
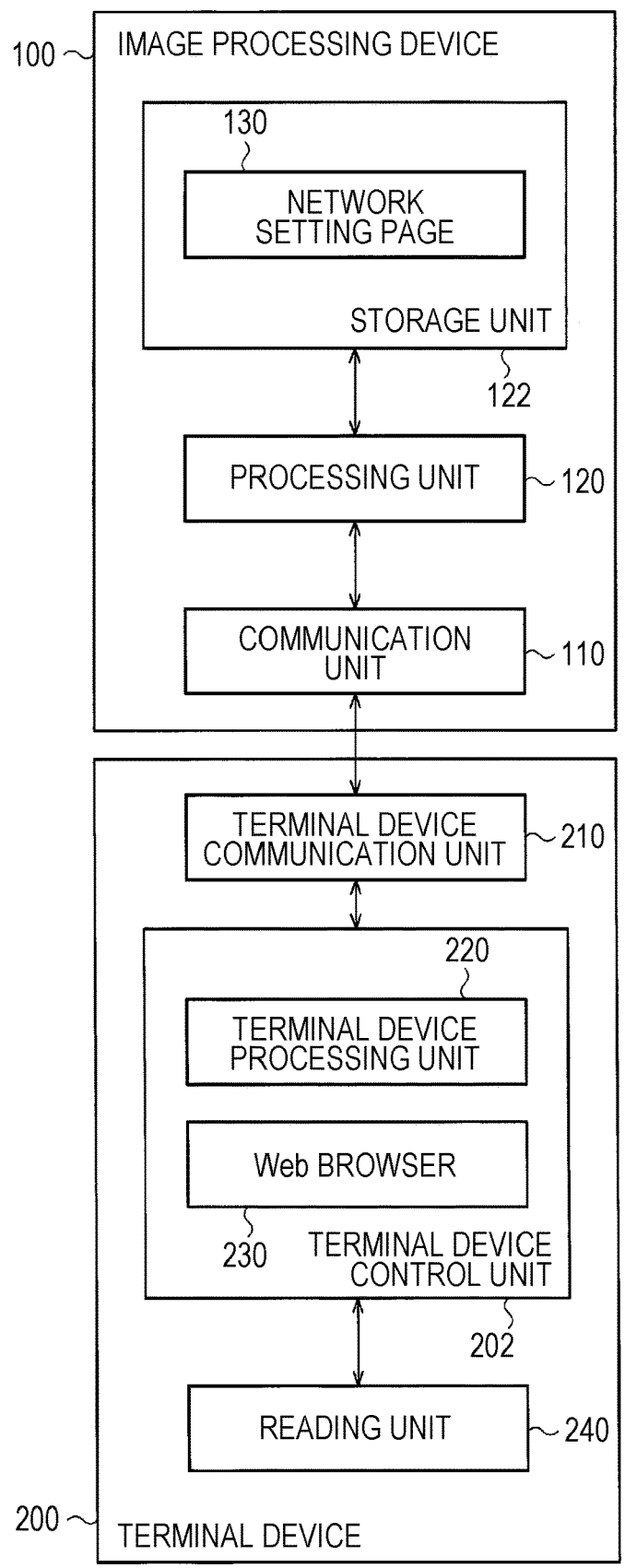
FIG. 1 is a block diagram illustrating a configuration example of an image processing device.

FIG. 1 is a block diagram illustrating a configuration example of a system including an image processing device 100 and a terminal device 200 of this embodiment. The image processing device 100 of this embodiment is, for example, a printer, but may be a scanner, a personal computer, a wearable device, a biological information measurement device, a robot, a video device, a physical quantity measurement device, or the like. Note that the wearable device is a smartwatch, an activity tracker, or the like. The biological information measurement device is a pulse meter, a pedometer, or the like. The video device is a camera, a projector, or the like. The physical quantity measurement device is a thermometer, a weight scale, or the like. As used herein, the term "printer" also includes a multifunctional machine. The term "multifunctional machine" refers to a printer including some other function than a printer function. Some other function than a printer function is a copy function, a facsimile function, a scanner function, or the like, and may be also other functions.

The image processing device 100 includes a communication unit 110, a processing unit 120, and a storage unit 122, and performs wireless communication with the terminal device 200 by the communication unit 110. Note that the image processing device 100 of this embodiment is not limited to a configuration illustrated in FIG. 1, and various modifications, such as omitting some of components, adding other components, or the like, are possible. Other components are, for example, a printing unit 140, a display unit 150, or the like that will be described later. The image processing device 100 may further include an operation unit, and the operation unit may be, for example, hardware integrated with the display unit 150 via a touch panel.

The communication unit 110 is a communication interface that performs communication in accordance with a predetermined communication standard. The communication unit 110 can be realized by communication hardware, such as, for example, a communication application specific integrated circuit (ASIC), a communication processor, or the like, communication firmware, or the like. In this embodiment, the communication unit 110 can transmit information to an external device of the image processing device 100 or the like and receive information from the external device by performing transmission processing or receiving processing of information or the like and communication control processing on the communication unit 110 by the processing unit 120 that will be described later. Note that, for a predetermined wireless communication standard, there may be a plurality of kinds of standard. That is, the communication unit 110 includes hardware, communication firmware, or the like, each corresponding to a desired wireless communication standard. The predetermined communication standard is for wireless communication, for example, by Wi-Fi (registered trademark) or the like, and the communication unit 110 performs wireless communication in a predetermined connection mode of Wi-Fi.

Although details will be described later, the predetermined connection mode is, for example, a Wi-Fi Direct (registered trademark) mode. Note that Wi-Fi Direct can be also called direct connection. That is, the image processing device 100 functions as a group owner having the terminal device 200 as a client. The predetermined connection mode may be, for example, an infrastructure mode, although details will be described later. That is, the image processing device 100 communicates with the terminal device 200 via an external access point 300 that will be described later, or the like. Note that, in the following description and the accompanying drawings, an access point is sometimes expressed simply as AP. The predetermined connection mode may be, for example, an ad hoc mode or the like.

Note that the predetermined wireless communication standard may be some other wireless communication standard, such as, for example, Bluetooth (registered trademark) or the like, and may be a wired communication standard. In the following description, a "communication connection in accordance with a communication standard" will be also referred to as merely a "connection."

The processing unit 120 performs processing of each component of the image processing device 100. The processing unit 120 is configured of following hardware. The hardware includes a circuit that processes digital signals, and may further include a circuit that processes analog signals. For example, the hardware can be configured of one or more circuit devices mounted on a circuit board and one or more circuit elements. The one or more circuit devices are, for example, an integrated circuit (IC), a field-programmable gate array (FPGA), or the like. The one or more circuit elements are, for example, a resistor, a capacitor, or the like. The processing unit 120 is realized by including at least one of processors described below. The processing unit 120 includes the storage unit 122 that stores information, a processor that operates based on the information stored in the storage unit 122. The information is, for example, a program, various types of data, or the like. The processor includes hardware. As the processor, various types of processors, such as, a central processing unit (CPU), a graphic processing unit (GPU), a digital signal processor (DSP), or the like, can be used. The storage unit 122 may be a semiconductor memory, such as a static random access memory (SRAM), a dynamic random access memory (DRAM), or the like, may be a register, may be a magnetic storage unit, such as a hard disk drive (HDD), and may be an optical storage device, such as an optical disk device or the like. For example, a computer-readable instruction is stored in the storage unit 122 and some or all of functions of components of the image processing device 100 are realized as processing by execution of the instruction by the processor. Herein, the instruction may be an instruction of an instruction set forming a program and may be an instruction that instructs a hardware circuit of the processor to operate.

Although illustration in FIG. 1 is omitted, the processing unit 120 of this embodiment performs a function as a software used for generating a two-dimensional code from predetermined information. The two-dimensional code is a code represented by a display system having information, for example, in the horizontal direction and the vertical direction, in contrast to a one-dimensional code having information only in a lateral direction. A type of the two-dimensional code of this embodiment may be a stacked type and may be a matrix type, and, for example, a QR code (registered trademark) can be employed for the two-dimensional code, although the two-dimensional code is not limited thereto. The predetermined information is, for example, an IP address corresponding to a network setting page 130, but may be some other information, such as, for example, a service set identifier (SSID) of an internal access point 112 that will be described later, or the like.

In the image processing device 100 of this embodiment, the network setting page 130 is stored in the storage unit 122. The network setting page 130 is page data that can be browsed via a predetermined browser installed in the external device. That is, the image processing device 100 includes a Web server. A user can browse information of the network setting page 130 by inputting a URL including a predetermined IP address to a Web browser 230 that will be described later with the terminal device 200 serving as a client of the Web server. Although information of the network setting page 130 includes, for example, network setting information, the information is not limited thereto. The information may be, for example, security setting information, and may include management information for consumables of the image processing device 100. The network setting information is, for example, network connection system information, identification information, such as an IP address or the like, communication speed information, or the like. The connection system information is, for example, information that specifies a wired mode or a wireless mode and, when a wireless mode is specified, is information that specifies an infrastructure mode or a direct connection mode, or the like. The consumables of the image processing device 100 are, for example, a cable, an ink, a toner, a lamp, or the like. Although not illustrated, the user can input an operation of changing a setting item displayed on the network setting page 130 or the like. That is, the user can change various settings related to the image processing device 100 by performing an operation at a terminal device 200 side via the network setting page 130, instead of operating an unillustrated operation unit of the image processing device 100.

The terminal device 200 is a portable information terminal, such as, for example, a smartphone or the like, and may be the above-described personal computer or the like. The terminal device 200 includes a terminal device control unit 202, a terminal device communication unit 210, and a reading unit 240. Although not illustrated, the terminal device 200 may further include a terminal device display unit and may further include a terminal device operation unit, and the terminal device operation unit may be, for example, hardware integrated with the terminal device display unit via a touch panel.

The terminal device control unit 202 includes a terminal device processing unit 220 and the Web browser 230. That is, the terminal device control unit 202 is formed of the above-described hardware and performs functions of the terminal device processing unit 220 and the Web browser 230 as software by reading various programs from an unillustrated memory and performing input and output processing, display processing, or the like. The Web browser 230 of this embodiment is not necessarily software dedicated to the network setting page 130, and may be, for example, general-purpose software normally used for the terminal device 200.

Similar to the communication unit 110 of the image processing device 100, the terminal device communication unit 210 is a communication interface that corresponds to a predetermined communication standard, although detailed description thereof is redundant and therefore will be omitted. That is, the terminal device communication unit 210 of this embodiment includes hardware, communication firmware, or the like, each corresponding to the predetermined communication standard. Similar applies to modifications that will be described later.

The reading unit 240 reads the two-dimensional code described above. That is, the reading unit 240 of this embodiment includes hardware that reads a two-dimensional code output by the processing unit 120, the terminal device processing unit 220 includes software that restores the two-dimensional code to information that is a conversion source of the two-dimensional code and displays the information on an unillustrated terminal device display unit, so that a function as the reading unit 240 is performed. For this reason, the reading unit 240 of this embodiment includes hardware corresponding to a standard of the two-dimensional code output by the processing unit 120. For example, when the processing unit 120 generates a two-dimensional code of a matrix type, the reading unit 240 of the terminal device 200 includes a CCD scanner corresponding to two dimensions. Note that, when the terminal device 200 is a smartphone including, for example, a camera function, the reading unit 240 may include a camera as hardware and the terminal device processing unit 220 may include software that analyzes an image of a two-dimensional code taken by the camera and restores the two-dimensional code to information that is a conversion source of the two-dimensional code, so that the function as the reading unit 240 is performed.

Figure 2:
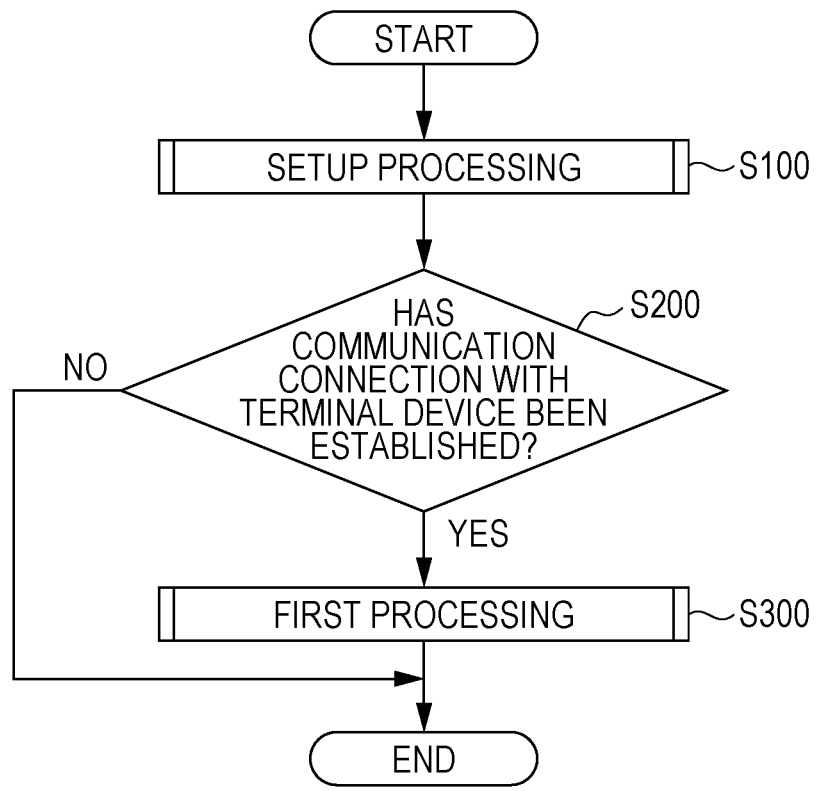
FIG. 2 is a flowchart illustrating a processing example of an embodiment.

FIG. 2 is a flowchart illustrating a processing example according to this embodiment. For example, when the user turns on a power source of the image processing device 100, the processing unit 120 performs setup processing (Step S100). Details of the setup processing (Step S100) will be described later with reference to FIG. 3 and subsequent drawings. Thereafter, the processing unit 120 performs processing of determining whether a communication connection with the terminal device 200 has been established (Step S200). When it is determined that a communication connection with the terminal device 200 has been established (YES in Step S200), the processing unit 120 performs first processing (Step S300), and terminates a flow. Details of the first processing (Step S300) will be described later with reference to FIG. 4 and subsequent drawings. On the other hand, when it is determined that a communication connection with the terminal device 200 has not been established (NO in Step S200), the processing unit 120 terminates the flow. When it is desired to try to establish a communication connection with the terminal device 200 again, the user may temporarily turn off the power source of the image processing device 100 and then turn on the power source again. Thus, processing of FIG. 2 is performed again.

Figure 3:
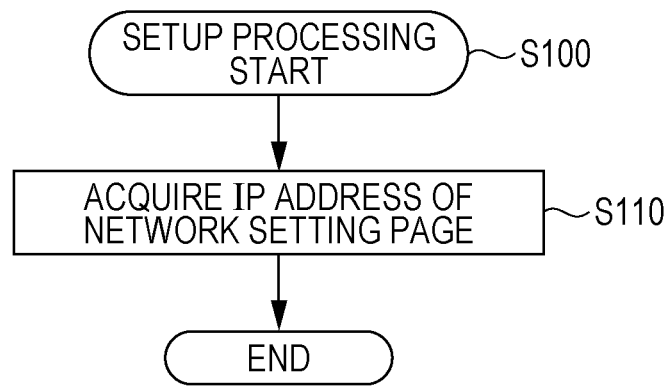
FIG. 3 is a flowchart illustrating a processing example of setup processing.

With reference to FIG. 3, a processing example of the setup processing (Step S100) will be described. Note that, although not illustrated in FIG. 3 or the like), the setup processing (Step S100) includes processing of starting each module of the image processing device 100 after the power source has been turned on, or the like.

The processing unit 120 performs processing of acquiring an IP address of the network setting page 130 (Step S110), and terminates the flow. For example, the image processing device 100 is configured such that private IP addresses in a certain range can be used. The processing unit 120 performs processing of selecting an arbitrary IP address from the private IP addresses in the certain range. For example, processing of automatically acquiring an IP address using a dynamic host configuration protocol (DHCP) function can be performed as Step S110. Note that the processing example of the setup processing (Step S100) is not limited to that illustrated in FIG. 3, various modifications, such as adding other processing or the like, can be made, and details will be described later.

Figure 4:
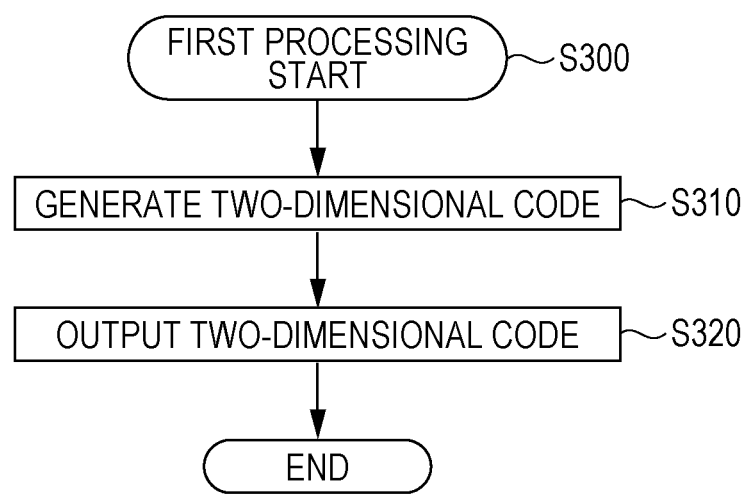
FIG. 4 is a flowchart illustrating a processing example of first processing.

FIG. 4 is a flowchart illustrating a processing example of the first step (Step S300). The processing unit 120 performs processing of generating a two-dimensional code (Step S310). For example, the processing unit 120 performs processing of encoding information of the IP address acquired in Step S110 of FIG. 3 in accordance with a standard of a desired two-dimensional code. Note that the processing is performed by a well-known method, and therefore, detailed description thereof will be omitted.

Thereafter, the processing unit 120 performs processing of outputting the two-dimensional code (Step S320). Specifically, the processing unit 120 performs processing of outputting the two-dimensional code generated in Step S310. The processing of outputting the two-dimensional code herein is, for example, processing of printing the two-dimensional code on a print medium P that will be described later. Specifically, for example, when the image processing device 100 includes the printing unit 140 that will be described later, the processing unit 120 performs processing of causing the printing unit 140 to print an image of the two-dimensional code generated in Step S310. For example, processing of displaying an image of the two-dimensional code on a predetermined display device may be performed as the processing of outputting the two-dimensional code. The predetermined display device is, for example, the display unit 150 that will be described later, but is not limited thereto. The predetermined display device may be a display device of an external device coupled to the image processing device 100 via a predetermined video signal cable. Note that the processing example of the first processing (Step S300) is not limited to that illustrated in FIG. 3, various modifications, such as adding other processing or the like, can be made, and details will be described later.

Figure 5:
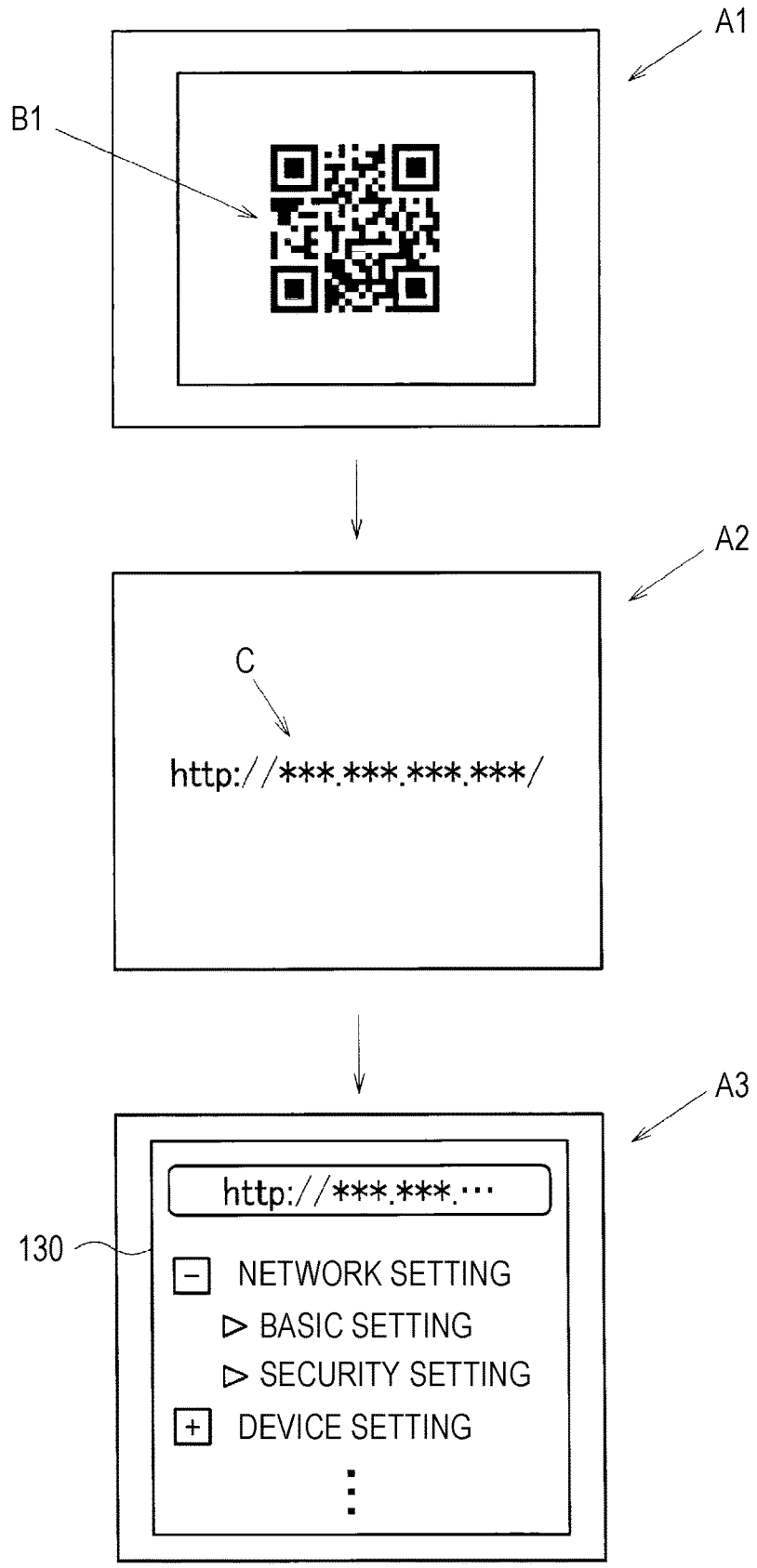
FIG. 5 is a view illustrating a flow of a method for displaying a network setting page.

By doing so, the user can browse the network setting page 130, or the like, using the output two-dimensional code. For example, the user performs a work of reading the two-dimensional code output in Step S320 of FIG. 4. More specifically, an unillustrated imaging unit of the terminal device 200 images the two-dimensional code, and thus, as illustrated in a screen example of A1 of FIG. 5, an image of a two-dimensional code illustrated in B1 is displayed on the terminal device display unit. The terminal device processing unit 220 performs processing of controlling the two-dimensional CCD scanner of the reading unit 240 to restore information based on the image of the two-dimensional code. Thus, the screen example of A1 is displayed, for example, as in a screen example of A2. In the screen example of A2, for example, an image including a URL indicated by C is displayed. When the user performs an operation of selecting the image indicated by C, the network setting page 130 is displayed on the terminal device display unit as a screen example illustrated in A3. That is, when the user selects the image including the URL indicated by C, the terminal device processing unit 220 performs processing of requesting the image processing device 100 for data of the network setting page 130 and processing of starting the Web browser 230. The Web browser 230 performs processing of displaying the acquired data of the network setting page 130. Thus, the user of the terminal device 200 can browse the network setting page 130 and perform network setting related to the image processing device 100 in more detail. For example, the user can perform confirmation of security setting, confirmation of commodities information, setting to change a connection mode, or the like.

Note that Step S320 of FIG. 4 is executed without any problem, unless otherwise stated. Therefore, illustration of processing of conforming whether execution of Step S320 is completed or the like is basically omitted. Similar applies to Step S330 and Step S334 in an example that will be described later.

The method of this embodiment is not limited to processing illustrated in FIG. 2 to FIG. 4. For example, Step S110 of FIG. 3 that will be described later may be, for example, a processing example that is performed immediately before Step S310 of FIG. 4 that will be described with reference to FIG. 4. Similar applies to each of modifications that will be described later. Processing in which, after each module of the image processing device 100 is started by the setup processing (Step S100) of FIG. 3, Step S200 is periodically executed may be employed.

As has been described above, the image processing device 100 of this embodiment includes the communication unit 110 that performs wireless communication with the terminal device 200 and the processing unit 120 that generates a two-dimensional code including address information that specifies the network setting page 130 used for performing network setting with the image processing device 100. When the communication unit 110 establishes a wireless connection with the terminal device 200, the processing unit 120 performs processing of outputting the generated two-dimensional code.

The image processing device 100 of this embodiment includes the communication unit 110, and thus, can perform a wireless connection with the terminal device 200. The image processing device 100 of this embodiment stores the network setting page 130, so that the user of the terminal device 200 can display the network setting page 130 by the Web browser 230 and can perform detailed network setting for the image processing device 100. The image processing device 100 of this embodiment includes the processing unit 120, and thus, can generate the two-dimensional code including address information that specifies the network setting page 130. When the communication unit 110 establishes a wireless connection with the terminal device 200, the processing unit 120 performs processing of outputting the generated two-dimensional code, so that the user can quickly display the network setting page 130. Thus, the user can perform detailed network setting for the image processing device 100 and the terminal device 200 quickly from when the wireless connection is established.

For example, a case where it is desired to wirelessly connect a projector that is the image processing device 100 to the terminal device 200 and hold a conference, for example, in a predetermined facility will be considered. Herein, the predetermined facility is a public facility in which a predetermined external access point 300 is installed and a visitor can freely access the predetermined external access point 300. In the predetermined facility, after a wireless connection of the image processing device 100 with the terminal device 200 is established, it is desirable that information of security and commodities are quickly confirmed. In this case, the user of the terminal device 200 is required to perform a first work of checking an IP address of the image processing device 100, a second work of manually starting the Web browser 230, and a third work of manually inputting an URL of the image processing device 100, and therefor, a large burden is imposed on the user. For example, the third work is a manual work, and therefore, in particular, when a size of the terminal device 200 small, it is highly likely that an input error or the like occurs in inputting the URL and this work is very troublesome to the user. Prolonging a time that it takes for the user to perform the first to third works unfavorably prolongs a state where details of security are unknown. In this point, by applying the method of this embodiment, at a time when wireless connection setting is established, for example, a two-dimensional code is displayed on the display unit of the projector that is the image processing device 100, and thus, the user of the terminal device 200 can easily open the network setting page 130 by performing procedures illustrated in FIG. 5. Thus, the network setting page 130 can be reliably displayed in a short time from when wireless connection setting is performed. Thus, convenience of the image processing device 100 can be enhanced. Up to now, the image processing device 100 that outputs the two-dimensional code when a wireless connection with the terminal device 200 is established has not been proposed.

The method of this embodiment may be realized by a processing method. That is, a processing method according to this embodiment includes processing of performing a wireless connection with the terminal device 200, processing of generating a two-dimensional code including address information that specifies the network setting page 130 used for performing network setting with the image processing device 100, and processing of outputting the generated two-dimensional code when a wireless connection with the terminal device 200 is established. Thus, similar effects to those described above can be achieved.

The method of this embodiment may be realized by a program. That is, a program according to this embodiment causes a computer to function as the communication unit 110 that performs a wireless connection with the terminal device 200 and the processing unit 120 that generates a two-dimensional code including address information that specifies the network setting page 130 used for performing network setting with the image processing device 100. The processing unit 120 performs processing of outputting the generated two-dimensional code when the communication unit 110 establishes a wireless connection with the terminal device 200. Thus, similar effects to those described above can be achieved.

The method of this embodiment is not limited to the foregoing, and various modifications can be made. For example, the image processing device 100 of this embodiment may be configured as illustrated in a configuration example illustrated in FIG. 6. Specifically, the communication unit 110 of the image processing device 100 of this embodiment may further include the internal access point 112 and an infrastructure mode communication unit 114. For example, the internal access point 112 can communicate with the terminal device communication unit 210 in a direct connection mode. The infrastructure mode communication unit 114 can access the external access point 300 and communicate with the terminal device communication unit 210 via the external access point 300. Note that connections in the direct mode and the infrastructure mode will be hereinafter described as an example, but this configuration does not prevent a configuration in which the communication unit 110 includes some other communication interface than the internal access point 112 and the infrastructure mode communication unit 114.

The communication unit 110 includes the internal access point 112, and thus, can perform a direct connection with the terminal device 200. The internal access point 112 functions as a software access point. For example, the internal access point 112 periodically broadcasts a wireless communication radio wave, such as a beacon or the like, in accordance with a standard of a direct connection. An advertise packet of the wireless communication radio wave includes information, such as an SSID that is identification information of the internal access point 112, or the like. The terminal device communication unit 210 executes scanning to receive the wireless communication radio wave broadcasted from the internal access point 112 to make a connection request to the scanned internal access point 112. A signal related to the connection request includes information of a password or the like corresponding to the SSID of the internal access point 112. Thus, a direct connection of the image processing device 100 with the terminal device 200 is enabled. Note that, after communication by a direct connection is established and then the communication is temporarily disconnected, the user is requested to perform connection setting again because an encryption key is changed or the like in some cases.

Figure 6:
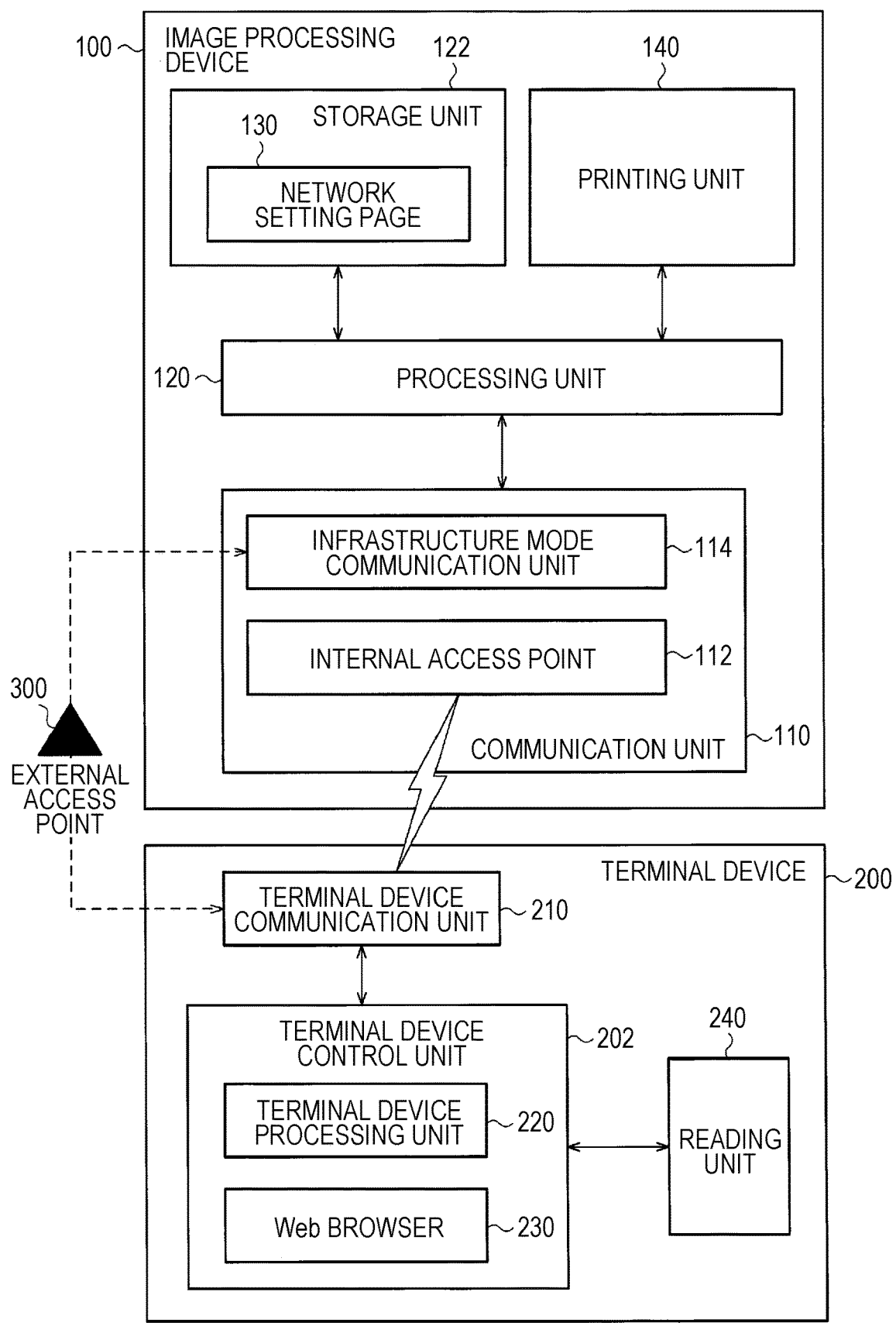
FIG. 6 is a block diagram illustrating another configuration example or the like of the image processing device.

The communication unit 110 includes the infrastructure mode communication unit 114, so that communication in an infrastructure mode of Wi-Fi via the external access point 300 illustrated in FIG. 6 is enabled. For example, the external access point 300 periodically broadcasts a wireless communication radio wave, such as a beacon or the like, such that an SSID as self-identification information can be decrypted. Then, a connection in the infrastructure mode of Wi-Fi is established by a method that will be described later. The access point can be also called "router." When communication in the infrastructure mode of Wi-Fi is established, even with the communication temporarily disconnected, a connection with the external access point 300 is automatically performed.

Figure 7:
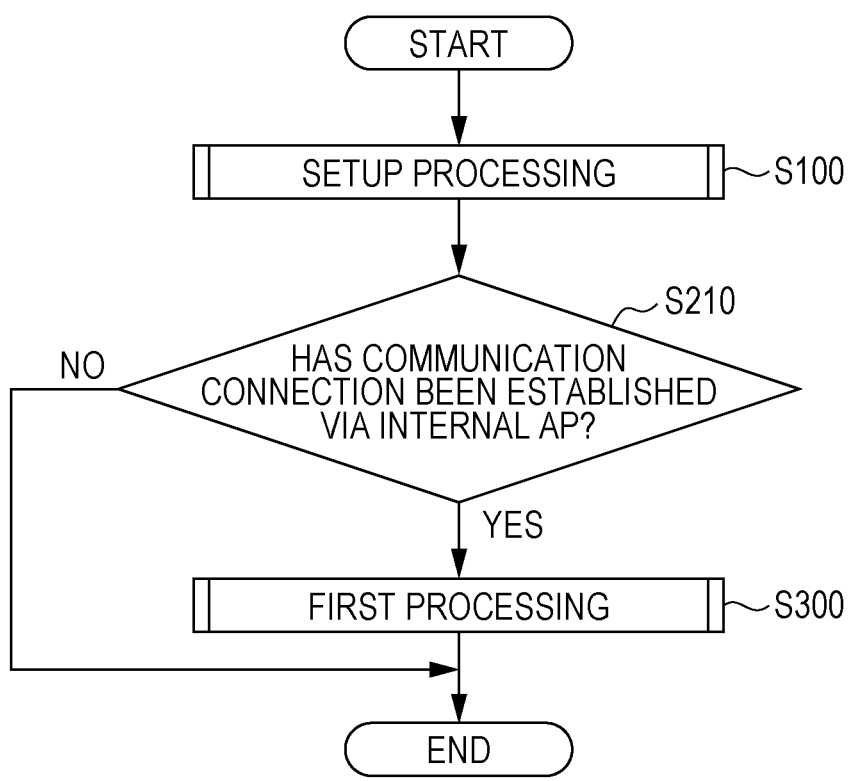
FIG. 7 is a flowchart illustrating another processing example of the embodiment.

When the image processing device 100 of this embodiment is configured as illustrated in the configuration example illustrated in FIG. 6, the processing example illustrated in FIG. 2 may be configured as a processing example illustrated in FIG. 7. Note that, in the following description of a flowchart, for processing overlapping with the processing that has been already described, description will be omitted as appropriate. Specifically, for example, the processing unit 120 may be configured to perform, after performing the setup processing (Step S100), processing of determining whether a communication connection with the terminal device 200 has been established via the internal access point 112 (Step S210). The processing unit 120 may be configured to terminate, when it is determined that communication with the terminal device 200 has been established via the internal access point 112 (YES in Step S210), the flow after performing the first processing (Step S300). On the other hand, the processing unit 120 may be configured to terminate the flow, when it is determined that communication with the terminal device 200 has not been established via the internal access point 112 (NO in Step S210).

The processing unit 120 performs processing of outputting the two-dimensional code (S320), as described above with reference to FIG. 4, in the first processing (Step S300). As described above, in the image processing device 100 of this embodiment, the communication unit 110 includes the internal access point 112 and, when the communication unit 110 establishes a wireless connection with the terminal device 200 via the internal access point 112, the processing unit 120 outputs the generated two-dimensional code. By doing so, convenience of network setting after a wireless connection via the internal access point 112 is established can be increased. For example, in order to change a predetermined connection mode after a connection of the image processing device 100 with the terminal device 200 via the internal access point 112 has been established in a direct connection mode, it is needed to display the network setting page 130. In this case, as described above, by applying the method of this embodiment, the user can quickly and reliably display the network setting page 130 after a connection in the direct connection mode has been established.

For example, the user may perform a setting operation in which, after a connection of the image processing device 100 with the terminal device 200 is established via the internal access point 112 in the direct connection mode, the terminal device display unit of the terminal device 200 is caused to display the network setting page 130 and the connection mode is changed to the infrastructure mode on the network setting page 130. As described above, in the image processing device 100 of this embodiment, network setting is communication connection setting with the external access point 300. By doing so, convenience of the system including the image processing device 100 and the terminal device 200 can be increased. The infrastructure mode is convenient in a point that the terminal device 200 can communication with some other external device than the image processing device 100, but it requires a troublesome work to the user to connect the image processing device 100 with the terminal device 200 in the infrastructure from beginning. Therefore, by initially connecting the image processing device 100 with the terminal device 200 in the direct connection mode and then changing the connection to a connection in the infrastructure mode, the image processing device 100 can be connected with the terminal device 200 in the infrastructure mode by an easy work to the user. Note that, when network setting is changed from the direct connection mode to the infrastructure mode, the IP address of the network setting page 130 is changed in some cases.

Figure 8:
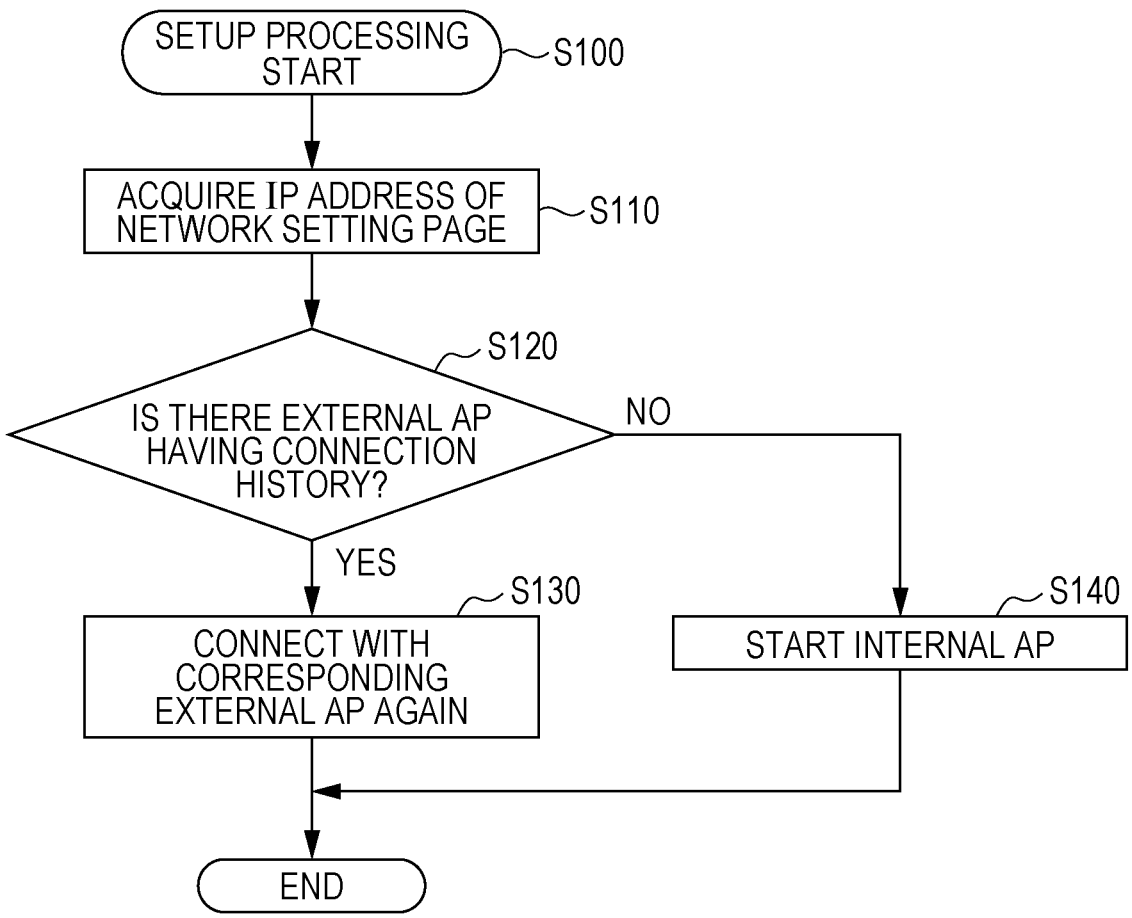
FIG. 8 is a flowchart illustrating another processing example of the setup processing.

In the image processing device 100 of this embodiment, the processing unit 120 may be configured to perform, when the communication unit 110 establishes an initial wireless connection with the terminal device 200, the processing of outputting the generated two-dimensional code and not to perform, when the communication unit 110 established a second or subsequent wireless connection, the processing of outputting the two-dimensional code. For example, this can be realized by performing the setup processing (Step S100) as in a processing example illustrated in FIG. 8.

The processing unit 120 performs, after performing Step S110 described above with reference to FIG. 4, processing of determining whether there is the external access point 300 having a connection history (Step S120). Specifically, for example, the processing unit 120 performs processing of determining whether the SSID included in the advertise packet of the external access point 300 that has been received matches the SSID stored in the storage unit 122. When it is determined that there is the external access point 300 having a connection history (YES in Step S120), the processing unit 120 performs processing of establishing a connection with the external access point 300 again (Step S130), and terminates the flow. On the other hand, when it is determined that there is no external access point 300 having a connection history (NO in Step S120), the processing unit 120 performs processing of starting the internal access point 112 (Step S140).

Assume that, for example, in initial wireless connection setting, setting in which the image processing device 100 is connected with the terminal device 200 via the internal access point 112 in the direct connection mode and then the connection mode is changed to the infrastructure mode in accordance with the network setting page 130 by the above-described method is performed. Thereafter, when the power source of the image processing device 100 is turned off and then the power source of the image processing device 100 is turned on again, in the setup processing (Step S100) illustrated in FIG. 8, a determination result is YES in Step S120, and therefore, Step S140 is not performed. Thus, in Step S210 of FIG. 7, a determination result is NO, and therefore, the first processing (Step S300) is not performed, so that the two-dimensional code is not output.

Based on the foregoing, in the image processing device 100 of this embodiment, when the communication unit 110 establishes the initial wireless connection with the terminal device 200 (NO in Step S120 and YES in Step S210), the processing unit 120 performs the processing of outputting the generated two-dimensional code and, when the communication unit 110 establishes the second or subsequent wireless connection (YES in Step S120), the processing unit 120 does not perform the processing of outputting the two-dimensional code. By doing so, unnecessary output of a two-dimensional code is not performed when the power source is turned on again. This is because, when network setting in the infrastructure mode is completed and the image processing device 100 is continuously used in the same place, it is not needed to perform network setting again.

The communication unit 110 of the image processing device 100 of this embodiment may further include the printing unit 140. The printing unit 140 includes a print engine that is a mechanical configuration that executes printing of an image on the print medium P. The print engine includes, for example, a transport mechanism, an ink jet type ejection head, a carriage drive mechanism including the ejection head, or the like. The printing unit 140 prints the image on the print medium P by an ejecting ink from the ejection head to the print medium P transported by the transport mechanism. As the print medium P, various media, such as paper, fabric, or the like, can be used. Note that the printing unit 140 may include a print engine having a configuration in which printing is performed using a toner in an electrophotographic manner.

Figure 9:
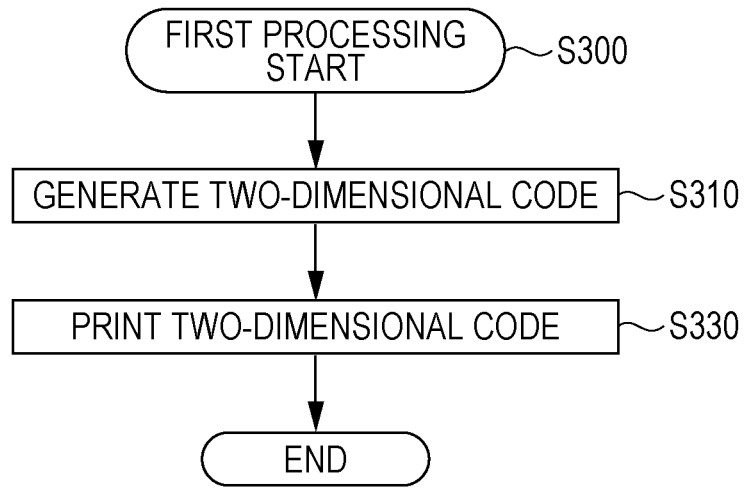
FIG. 9 is a flowchart illustrating another processing example of the first processing.
Figure 10:
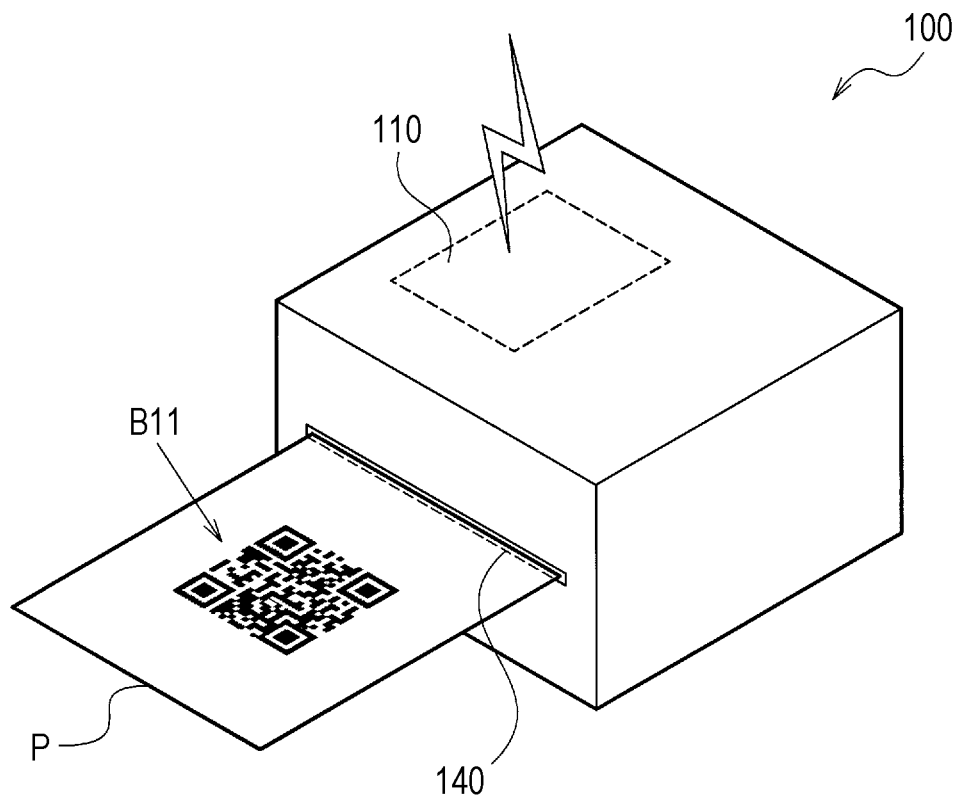
FIG. 10 is a view illustrating an example of output of a two-dimensional code.

When the image processing device 100 of this embodiment further includes the printing unit 140, the first processing (Step S300) may be configured as illustrated in a processing example illustrated in FIG. 9. The processing unit 120 performs, after performing Step S310 described above with reference to FIG. 4, processing of printing the two-dimensional code (Step S330). Thus, in the image processing device 100 of this embodiment, when the communication unit 110 establishes a wireless connection with the terminal device 200, the processing unit 120 performs the processing of printing the generated two-dimensional code. By doing so, convenience in displaying the network setting page 130 when wireless connection setting is preformed can be increased. For example, when the image processing device 100 is a receipt printer illustrated in FIG. 10, at a timing at which a wireless connection with the terminal device 200 is established, the print medium P that is receipt paper and on which a two-dimensional code illustrated in B11 is printed by the printing unit 140 is ejected. The print medium P can be easily cut and separated from the image processing device 100, and therefore, the user can easily perform a work of reading the two-dimensional code in a place separated from the image processing device 100. The receipt printer as the image processing device 100 is small, and therefore, many models do not include the display unit 150 or have the display unit 150 having a small size. Therefore, it is a burden on the user to perform network setting by directly operating the receipt printer. In this point, by applying the method of this embodiment, the two-dimensional code is printed on the print medium P, so that the user can easily perform network setting for the image processing device 100 by operating the terminal device 200.

The image processing device 100 illustrated in FIG. 6 is configured as a configuration example further including, in addition to the printing unit 140, the internal access point 112 and the infrastructure mode communication unit 114. However, either the internal access point 112 or the infrastructure mode communication unit 114 may be omitted.

Figure 11:
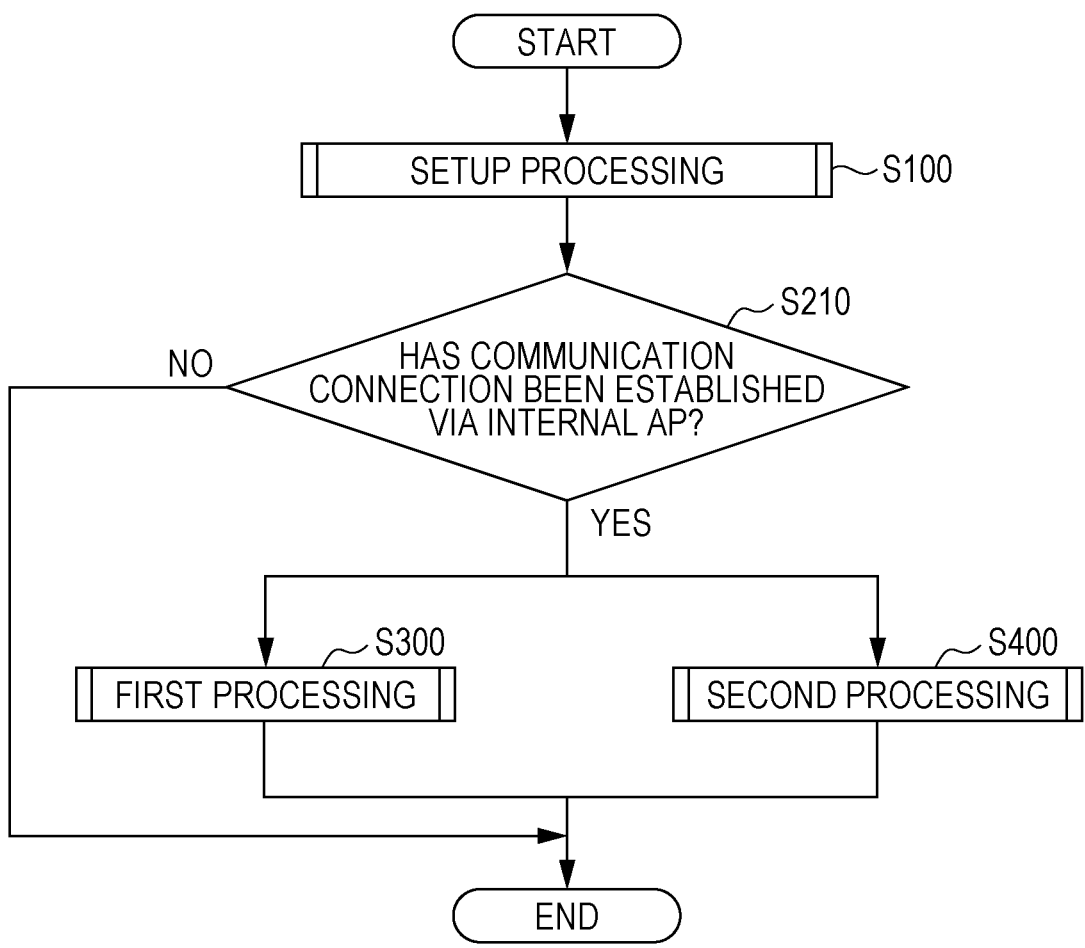
FIG. 11 is a flowchart illustrating another processing example of the embodiment.

The method of this embodiment is not limited to the foregoing and, for example, the processing example of FIG. 7 may be configured as a processing example illustrated in FIG. 11. Specifically, the processing unit 120 performs processing up to Step S210 of FIG. 7. Then, the processing unit 120 may be configured to terminate, when it is determined that a communication connection with the terminal device 200 has been established via the internal access point 112 (YES in Step S210), the flow after performing the first processing (Step S300) and the second processing (Step S400) in parallel. Because the first processing (Step S300) and the second processing (Step S400) are performed in parallel, for example, even when a situation in which the first processing (Step S300) has not been executed well for a first predetermined reason occurs, execution of the second processing (Step S400) is not affected. Similarly, for example, even when a situation in which the second processing (Step S400) has not been executed well for a second predetermined reason occurs, execution of the first processing (Step S300) is not affected. Note that the first predetermined reason and the second predetermined reason will be described later.

Figure 12:
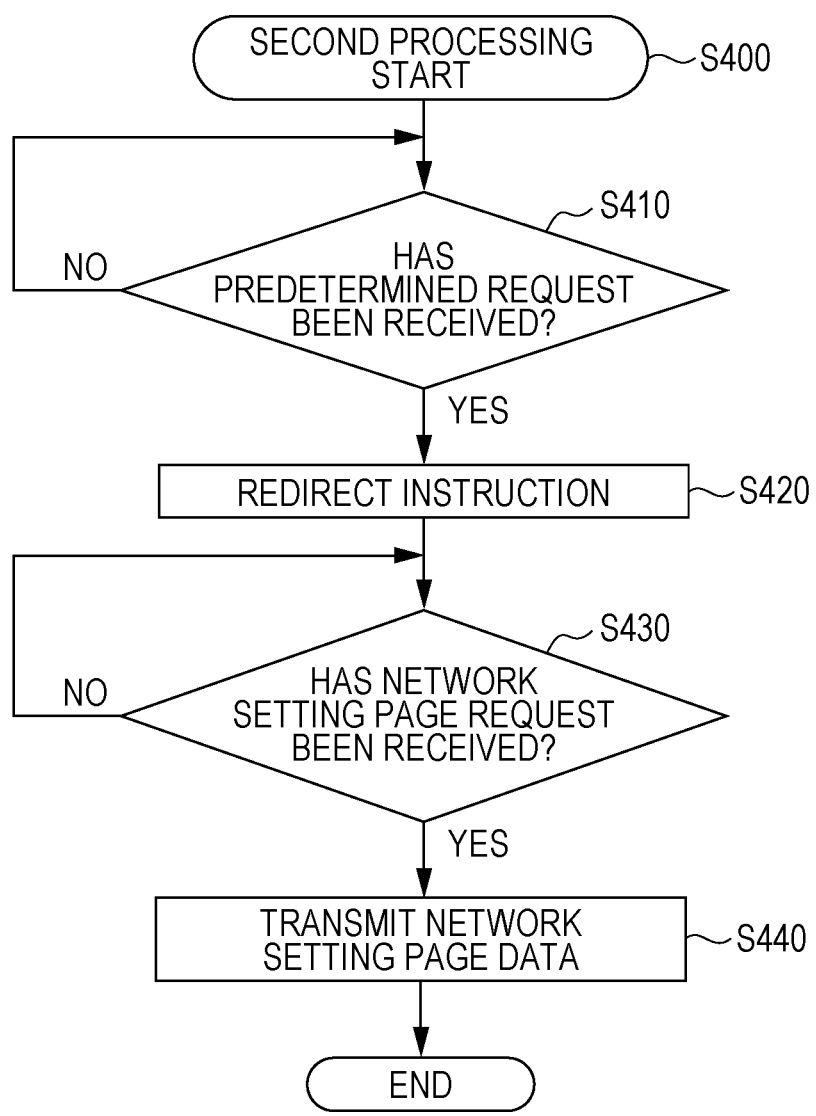
FIG. 12 is a flowchart illustrating a processing example of second processing.

With reference to FIG. 12, a detailed processing example of the second processing (Step S400) will be described. The processing unit 120 performs processing of determining whether a predetermined request has been received (Step S410). When it is determined that the predetermined request has been received (YES in Step S410), the processing unit 120 makes a redirect instruction (Step S420). On the other hand, when it is determined that the predetermined request has not been received (NO in Step S410), the processing unit 120 performs Step S410 again. The redirect instruction (Step S420) is processing of transmitting a command that causes the terminal device 200 to redirect a URL corresponding to the network setting page 130 to the terminal device 200.

Then, the processing unit 120 performs, after making the redirect instruction (Step S420), processing of determining whether a network setting page request has been received (Step S430). The network setting page request is a request via the URL corresponding to the network setting page 130. When it is determined that the network setting page request has been received (YES in Step S430), the processing unit 120 performs processing of transmitting network setting page data (Step S440) and terminates the flow. On the other hand, when it is determined that the network setting page request has not been received (NO in Step S430), the processing unit 120 performs Step S430 again. Note that, as long as the terminal device 200 normally operates, a situation in which a determination request continues to be NO in Step S430 is not assumed. Step S440 is processing of transmitting data of the network setting page 130 stored in the storage unit 122 to the terminal device 200.

Figure 13:
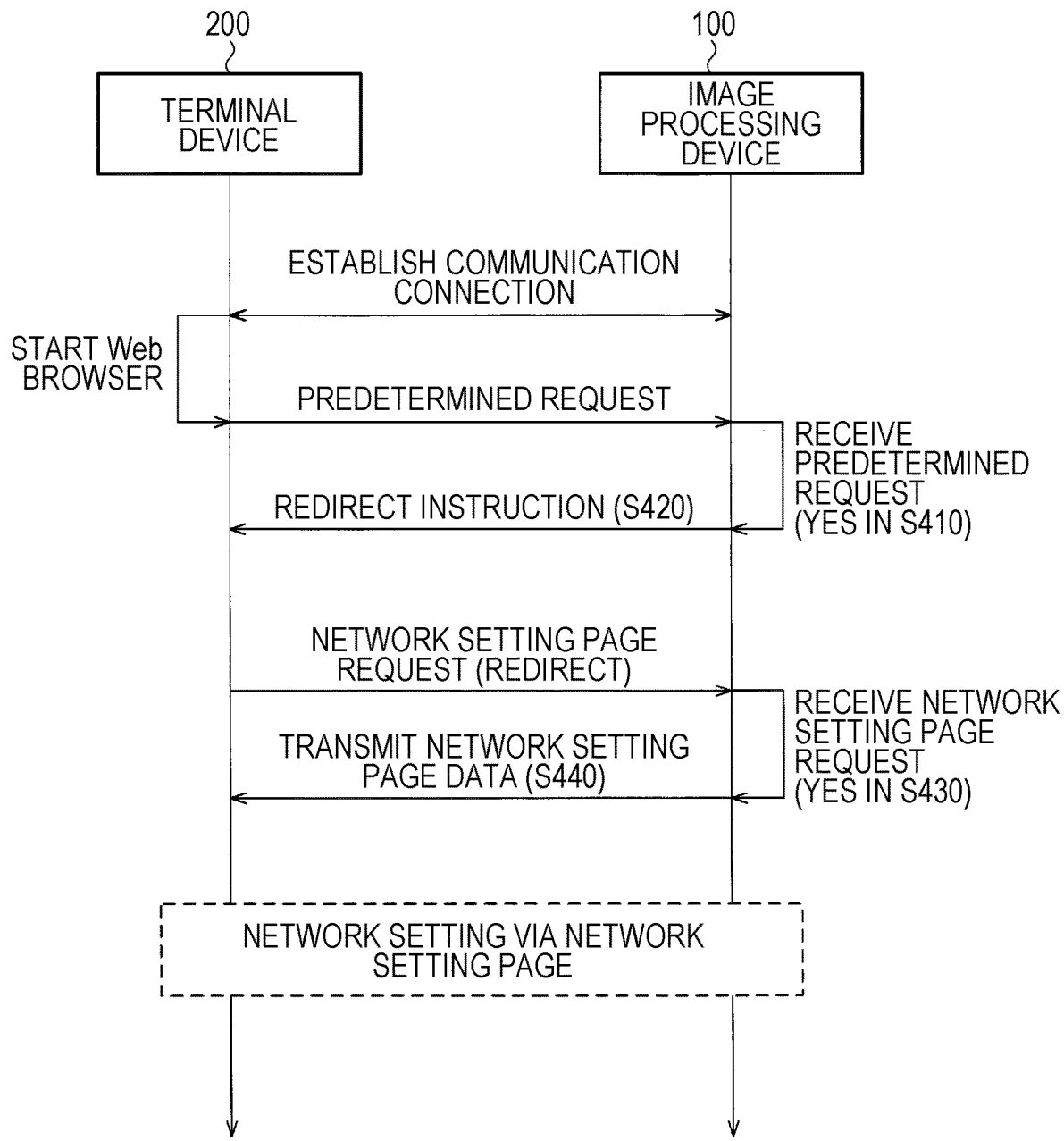
FIG. 13 is a diagram illustrating a flow of network setting to which the second processing is applied.

A flow of processing of the entire system including the image processing device 100 and the terminal device 200 when the second processing (Step S400) is applied is as illustrated in FIG. 13. When a communication connection via the internal access point 112 is established between the image processing device 100 and the terminal device 200, processing of starting the Web browser 230 and processing of transmitting a predetermined request to the image processing device 100 are performed on the image processing device 100 from the terminal device 200. Note that the processing of starting the Web browser 230 and the processing of transmitting a predetermined request to the image processing device 100 are automatically performed by the terminal device processing unit 220 in some cases and are manually performed by the user in other cases.

On receiving the predetermined request, the processing unit 120 determines YES in Step S410 in FIG. 12, the processing unit 120 makes the redirect instruction (Step S420) to the terminal device 200. Thus, the terminal device processing unit 220 performs processing of redirecting the network setting page request in a state where the Web browser 230 is kept running. In other words, the terminal device processing unit 220 performs processing of automatically inputting the URL of the network setting page 130 in the Web browser 230 and transmitting a request based on the URL to the communication unit 110. Then, on receiving the network setting page request via the communication unit 110, the processing unit 120 determines YES in Step S430 and transmits network setting page data to the terminal device 200 (Step S440). Thus, the user can browse the network setting page 130 displayed on the Web browser 230.

Note that, when the terminal device 200 satisfies a predetermined condition, processing illustrated in FIG. 13 is all automatically performed. In other words, in a case where the terminal device 200 satisfies the predetermined condition, when a communication connection via the internal access point 112 is established between the image processing device 100 and the terminal device 200, the network setting page 130 is automatically displayed on the Web browser. The predetermined condition is that, when a communication connection via the internal access point 112 is established between the image processing device 100 and the terminal device 200, the terminal device processing unit 220 automatically performs the processing of starting the Web browser 230 and the processing of transmitting the predetermined request to the image processing device 100.

Based on the foregoing, in the image processing device 100 of this embodiment, when the communication unit 110 establishes a wireless connection with the terminal device 200, the processing unit 120 performs the second processing (Step S400) that is the processing of causing the terminal device 200 to redirect to the network setting page 130 and the first processing (Step S300) that is the processing of outputting the generated two-dimensional code in parallel. By doing so, regardless of a specification of the terminal device 200, necessary processing for displaying the network setting page 130 can be reliably performed. For example, as described above, when the terminal device 200 satisfies the predetermined condition, the second processing (Step S400) is convenient for the user, but not all the terminal devices 200 satisfy the predetermined condition. In addition, it is an excessive burden on the user to check which terminal device 200 satisfies the predetermined condition. In this point, by applying the method of this embodiment, even when the user does not know whether the terminal device 200 satisfies the predetermined condition, the two-dimensional code is output by the first processing (Step S300), so that necessary processing for displaying the network setting page 130 can be reliably performed.

Note that, although not illustrated in the flowchart, a flow in FIG. 11 may be configured as illustrated in a processing example in which, when a determination result is YES in Step S210, only the second processing (Step S400) is performed and, when it is determined that the second processing (Step S400) has not been executed for the second predetermined reason, the first processing (Step S300) is performed. For example, in a case where, when Step S410 of FIG. 12 has not been temporarily executed, for example, because the terminal device 200 does not satisfy the predetermined condition, processing of forcibly terminating the second processing (Step S400) and processing of determining, when the forced termination has been performed, that the second processing (Step S400) has not been executed may be added. That is, the second predetermined reason is that the terminal device 200 does not satisfy the predetermined condition. Thus, by the first processing (Step S300), the two-dimensional code is output, and therefore, necessary processing for opening the network setting page 130 is reliably executed. Based on the foregoing, in the image processing device 100 of this embodiment, when the communication unit 110 establishes a wireless connection with the terminal device 200, the processing unit 120 performs the second processing (Step S400) that is the processing of causing the terminal device 200 to redirect to the network setting page 130. When the terminal device 200 cannot perform redirecting, the processing unit 120 performs the first processing (Step S300) that is the processing of outputting the generated two-dimensional code. By doing so, convenience of connection setting with the terminal device 200 can be increased while output of the two-dimensional is minimized. As long as the terminal device 200 satisfies the predetermined condition, the network setting page 130 is automatically displayed by the second processing (Step S400), so that the output of the two-dimensional code can be minimized.

Similarly, although not illustrated in the flowchart, the flow in FIG. 11 may be configured as illustrated in a processing example in which, when a determination result is YES in Step S210, only the first processing (Step S300) is performed and, when it is determined that the first processing (Step S300) has not been executed for the first predetermined reason, the second processing (Step S400) is performed. For example, processing of forcibly terminating the first processing (Step S300), for example, because it is detected that a commodity, such as the print medium P, ink, or the like, included in the image processing device 100 is insufficient, or the like, and processing of determining, when the forced termination has been performed, that the first processing (Step S300) has not been executed may be added. That is, the first predetermined reason is that the commodity included in the image processing device 100 is insufficient, or the like, but may be some other reason that prevents printing of the printing unit 140.

The method of this embodiment is not limited to the foregoing. For example, even after the initial wireless connection setting is established and the wireless connection setting in accordance with the network setting page 130 is completed, the two-dimensional code may be output. As described above, after wireless connection setting in the infrastructure mode is completed, it is not needed to output the two-dimensional code for the purpose of setting a network, but it is desired to open the network setting page 130 to confirm information of the commodity or the like in some cases. For example, a dedicated button may be provided in an unillustrated operation unit of the image processing device 100, the user may operate the dedicated button as a predetermined operation, and thus, the processing unit 120 may be configured to receive a signal from the dedicated button to perform processing of outputting the two-dimensional code in a similar manner to that illustrated in Step S320 of FIG. 4. As described above, in the image processing device 100 of this embodiment, when the predetermined operation is performed after a communication connection with the external access point 300 has been established, the processing unit 120 outputs the generated two-dimensional code again. By doing so, the two-dimensional code can be output at a desired timing. Thus, the network setting page 130 can be displayed at a desired timing.

Figure 14:
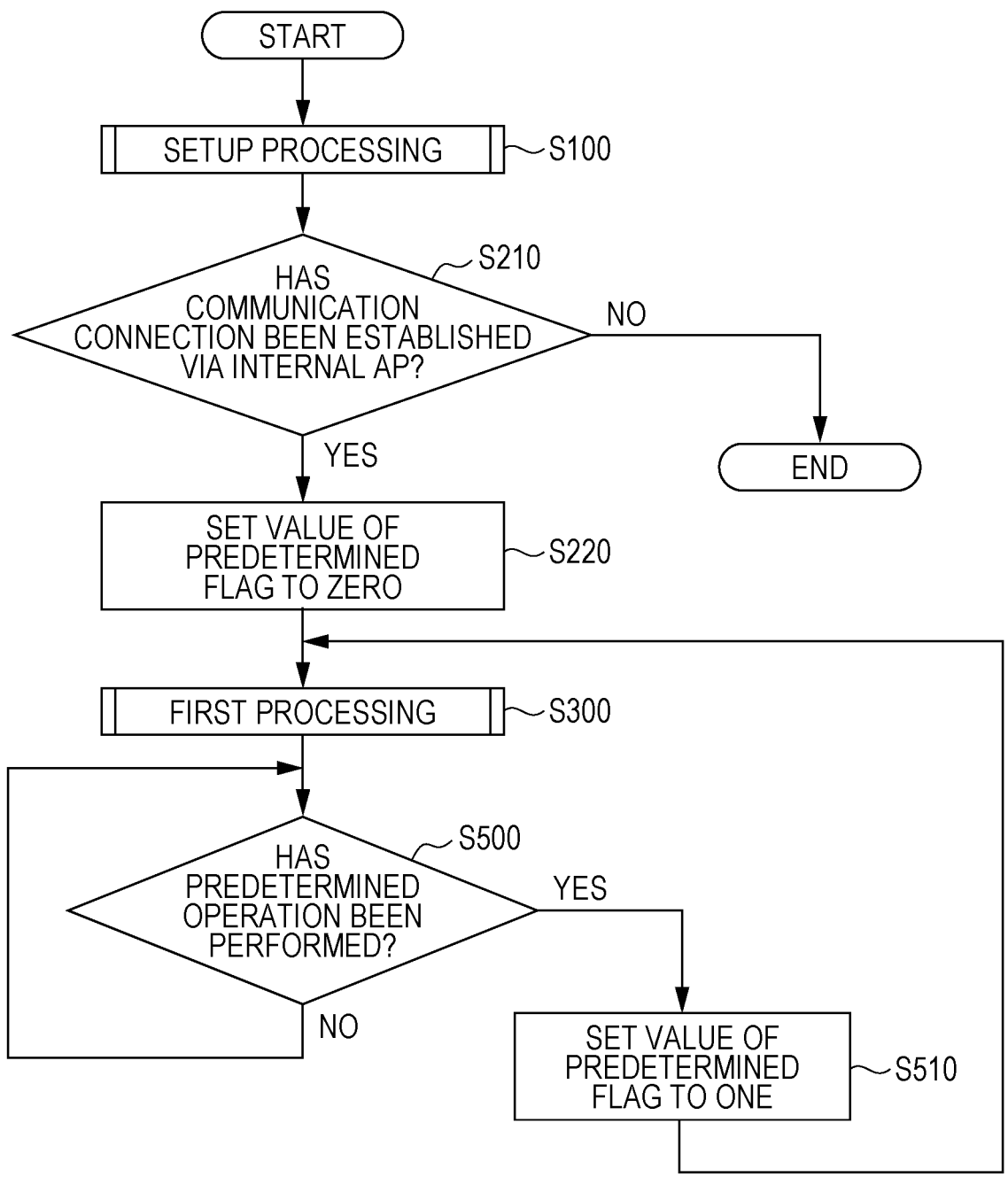
FIG. 14 is a flowchart illustrating another processing example of the embodiment.

In this example, for example, the processing example of FIG. 7 may be configured as a processing example illustrated in FIG. 14. The processing unit 120 performs processing up to Step S210 of FIG. 7. Then, when it is determined that communication with the terminal device 200 has been established via the internal access point 112 (YES in Step S210), after performing processing of setting a value of a predetermined flag to zero (Step S220), the processing unit 120 performs the first processing (Step S300). Note that the first processing (Step S300) in FIG. 14 will be described later with reference to FIG. 15. Thereafter, the processing unit 120 performs processing of determining whether the predetermined operation has been performed (Step S500). When it is determined that the predetermined operation has not been performed (NO in Step S500), the processing unit 120 performs Step S500 again. That is, when wireless connection setting in the infrastructure mode is completed and then there is no problem at all, this processing is kept performed. On the other hand, when it is determined that the predetermined operation has been performed (YES in Step S500), after performing processing of setting the value of the predetermined flag to one (Step S510), the first processing (Step S300) is executed.

Figure 15:
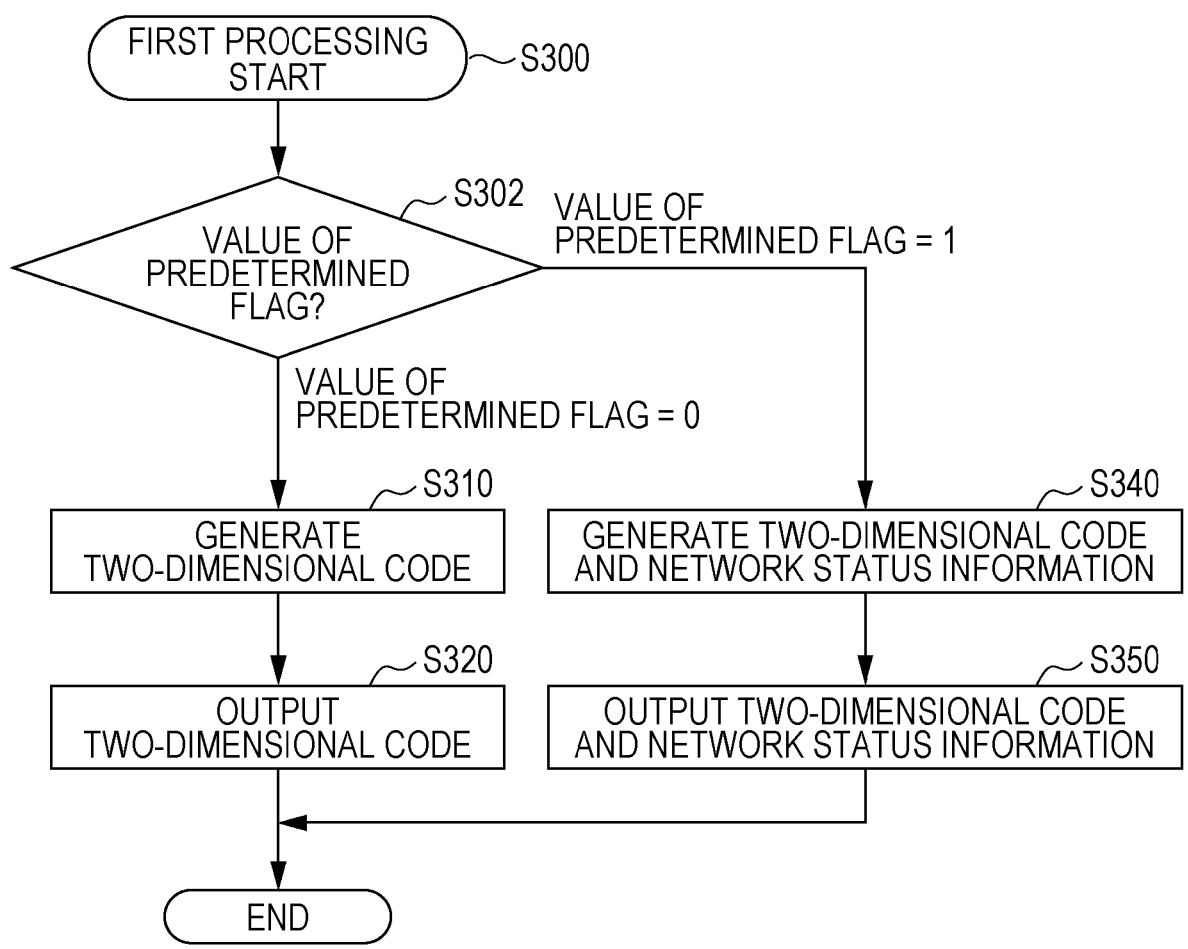
FIG. 15 is a flowchart illustrating another processing example of the first processing.

FIG. 15 illustrates a detailed processing example of the first processing (Step S300) illustrated in FIG. 14. The processing unit 120 performs processing of checking the value of the predetermined flag (Step S302). When the value of predetermined flag is zero in Step S302, similar to FIG. 4, the processing unit 120 performs Step S310 and Step S320, and terminates the flow. On the other hand, when the value of the predetermined flag is one in Step S302, the processing unit 120 performs processing of generating the two-dimensional code and network status information (Step S340) and processing of outputting the two-dimensional code and the network status information (Step S350), and terminates the flow.

Note that the two-dimensional code generated in Step S310 and the two-dimensional code generated in Step S340 are not always the same. This is because the two-dimensional code generated in Step S310 is a two-dimensional code based on an IP address automatically acquired at a timing after the power source is turned on, or the like, but the two-dimensional code generated in Step S340 is a two-dimensional code based on an IP address that can be automatically acquired again after network setting has been changed. Based on the foregoing, in the image processing device 100 of this embodiment, when, after a communication connection with the external access point 300 is established, the predetermined operation is performed, the processing unit 120 outputs the generated two-dimensional code again and outputs the network status information. By doing so, at a desired timing, the two-dimensional code can be output and the network status information can be output. For example, after wireless connection setting in the infrastructure mode is completed and during use of the image processing device 100, it is desired to check the network status information because a fault has occurred in a network connection, or the like, in some cases. In such a case, there are various items that are to be checked, and therefore, it is convenient for the user that, for example, the network status information and the network setting page 130 can be displayed on the display unit 150 that will be described later.

Figure 16:
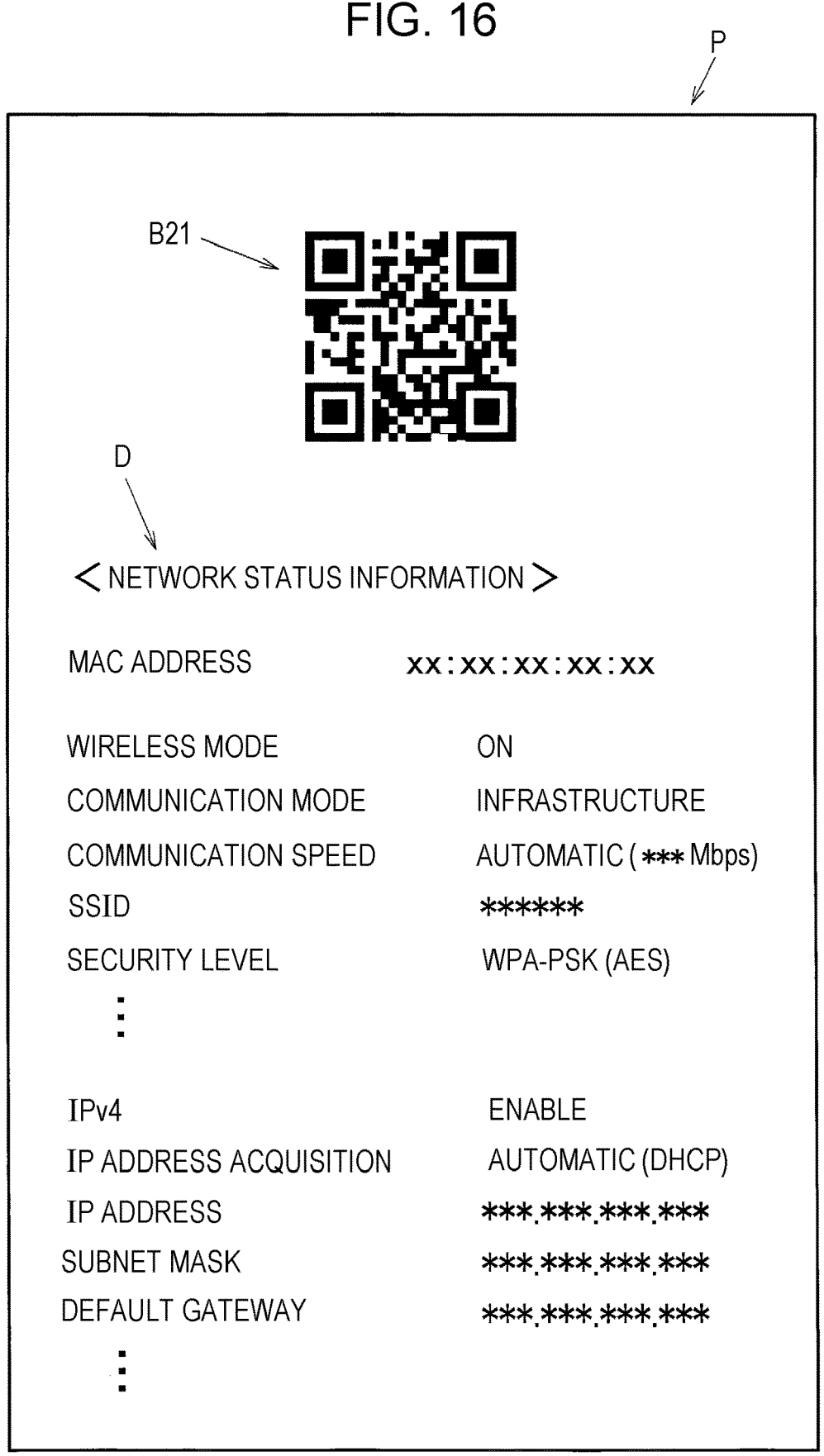
FIG. 16 is a view illustrating an example of a two-dimensional code and network status information.

The processing example of FIG. 15 and the processing example of FIG. 9 may be combined. That is, Step S350 of FIG. 15 may be processing of printing the two-dimensional code and the network status information. That is, for example, when the user performs a predetermined operation, the printing unit 140 prints a two-dimensional code illustrated in B21, the network status information illustrated in D on the print medium P, as illustrated in FIG. 16. Thus, in the image processing device 100 of this embodiment, when, after a communication connection with the external access point 300 is established, the predetermined operation is performed, the processing unit 120 performs processing of printing the generated two-dimensional code and the network status information. By doing so, the two-dimensional code can be printed at a desired timing and the network status information can be efficiently grasped. For example, when a size of the display unit 150 that will be described is small, not all the network status information is displayed at a time, and therefore, the display unit 150 with a small size is inconvenient for the user. In this point, by applying the method of this embodiment, the user can acquire the print medium P on which all the network status information is printed, so that the network status information can be efficiently grasped.

Figure 17:
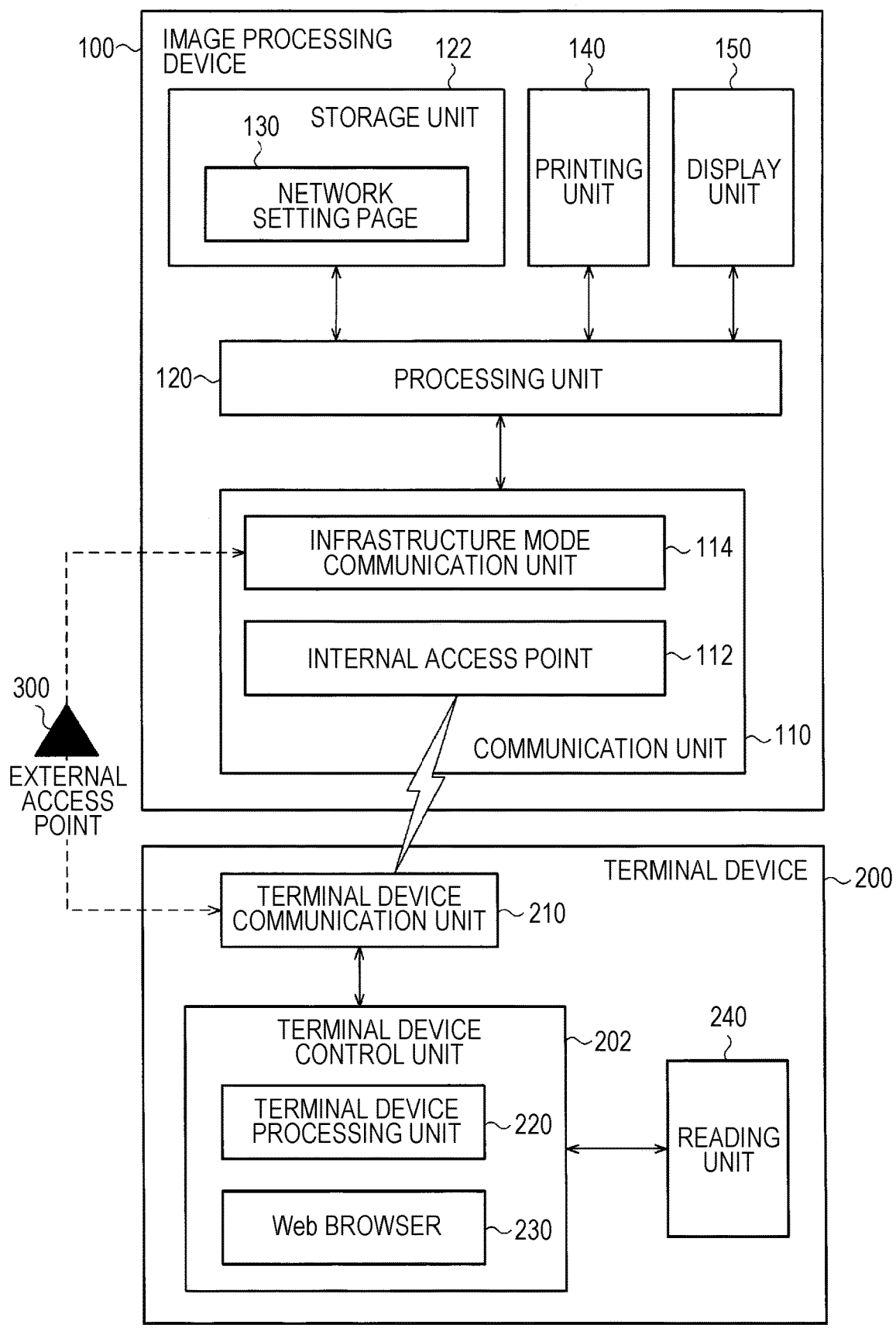
FIG. 17 is a block diagram illustrating another configuration example or the like of the image processing device.

Note that the method of this embodiment is not limited to the foregoing, and modifications, such as further adding some other configuration or the like, can be made. For example, as illustrated in FIG. 17, the image processing device 100 may be configured as a configuration example further including the display unit 150. In the configuration example of FIG. 17, for example, the first processing (Step S300) may be configured as illustrated in a processing example illustrated in FIG. 18.

Figure 18:
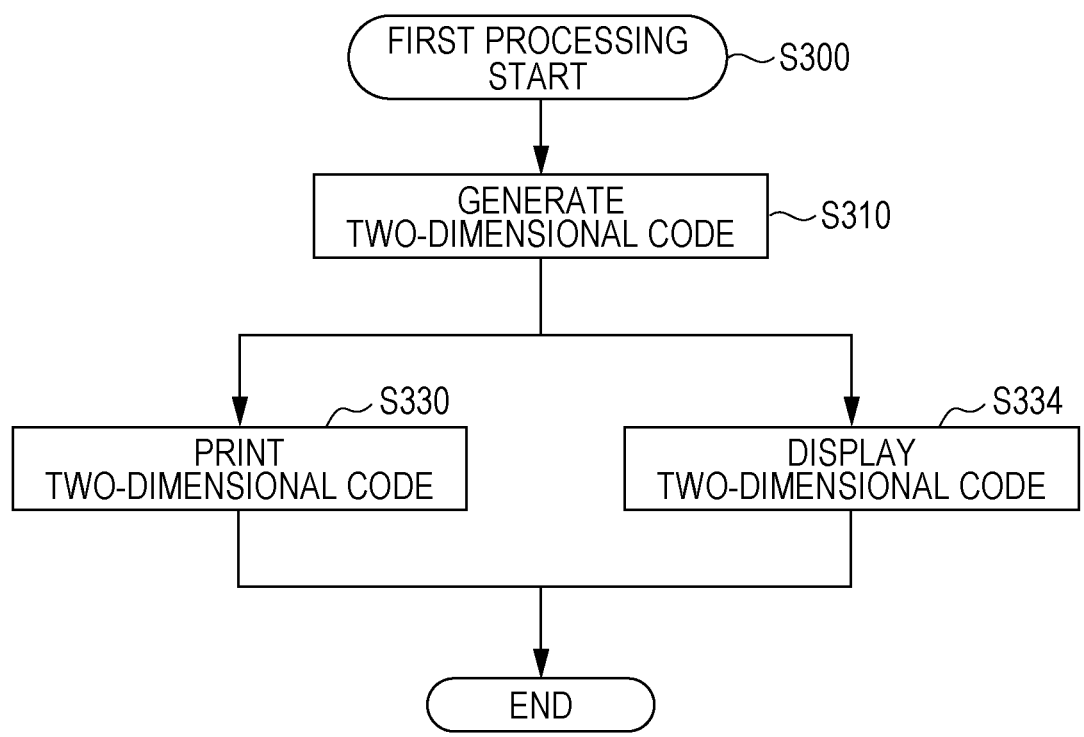
FIG. 18 is a flowchart illustrating another processing example of the first processing.
Figure 19:
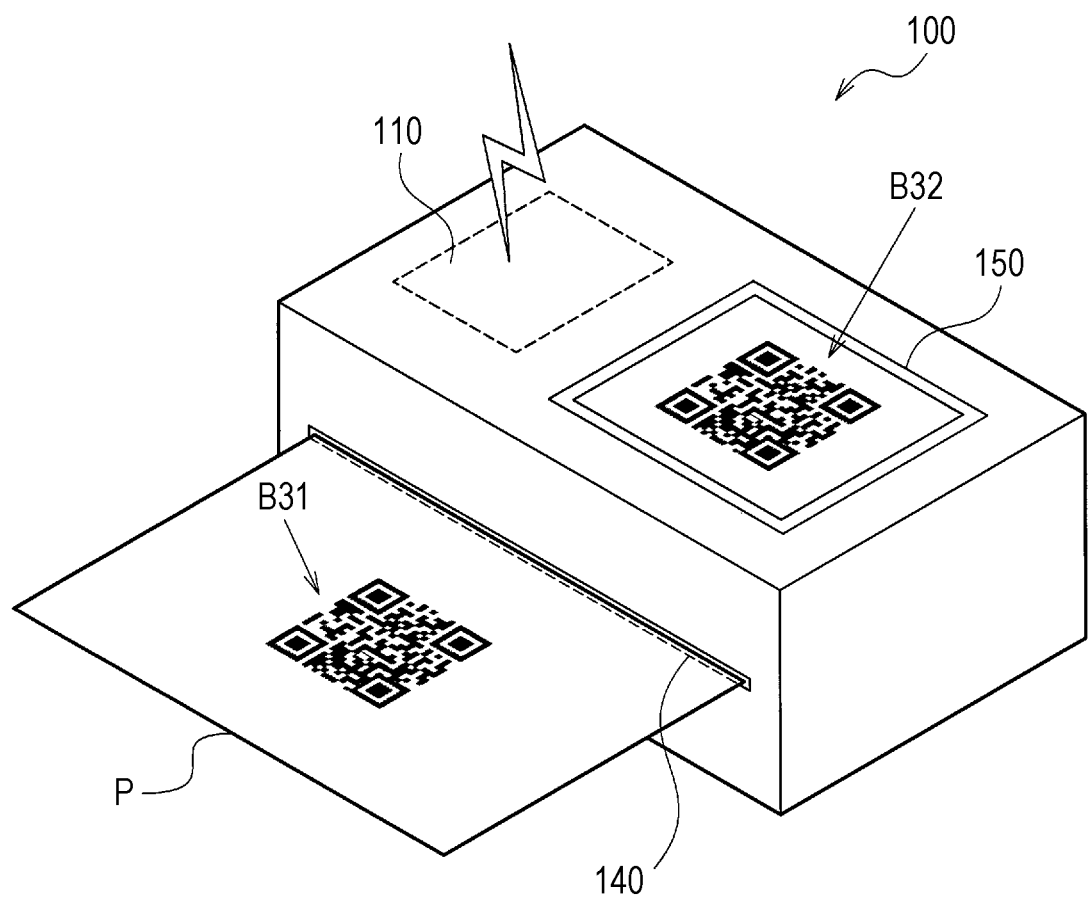
FIG. 19 is a view illustrating another example of output of a two-dimensional code.

A processing example of the first processing (Step S300) in a modified example of FIG. 17 is illustrated in FIG. 18. The processing unit 120 may be configured to perform, after performing Step S310 described above, processing of printing the two-dimensional code (Step S330) and processing of displaying the two-dimensional code (Step S334) in parallel. By doing so, for example, as illustrated in FIG. 19, when a communication connection with the terminal device 200 is established, the image processing device 100 ejects the print medium P on which a two-dimensional code illustrated in B31 is printed and displays a two-dimensional code illustrated in B32 on the display unit 150. Note that the two-dimensional code illustrated in B31 and the two-dimensional code illustrated in B32 are the same two-dimensional code and the user may read either one of the two-dimensional codes using the reading unit 240.

As described above, the image processing device 100 of this embodiment includes the display unit 150 and, when the communication unit 110 establishes a wireless connection with the terminal device 200, the processing unit 120 performs the processing of printing the generated two-dimensional code and the processing of displaying the generated two-dimensional code on the display unit 150 in parallel. By doing so, the two-dimensional code can be more reliably output. Thus, the network setting page 130 can be reliably displayed.

Figure 20:
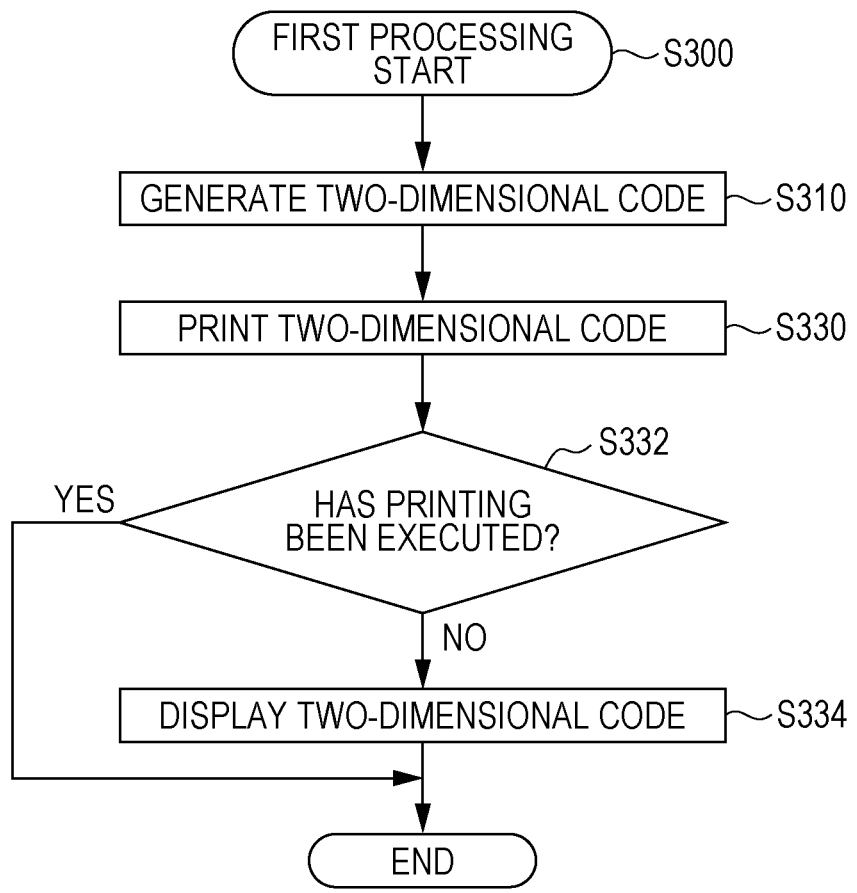
FIG. 20 is a flowchart illustrating another processing example of the first processing.

The processing example of the first processing (Step S300) in the modified example of FIG. 17 may be configured as illustrated in a processing example illustrated in FIG. 20. In FIG. 20, after performing Step S310, the processing unit 120 performs the processing of printing the two-dimensional code (S330). Thereafter, the processing unit 120 performs processing of determining whether printing has been executed (Step S332) and, when it is determined that printing has not been executed (NO in Step S332), the processing unit 120 performs the processing of displaying the two-dimensional code (Step S334), and terminates the flow. For example, Step S332 may be realized, for example, by processing of monitoring a remaining amount of each of the print medium P and the ink that are necessary for printing the two-dimensional code and determining that those materials are insufficient, or the like, and Step S332 may be realized by processing of determining whether a print error has occurred. On the other hand, when it is determined that printing has been executed (YES in Step S332), the processing unit 120 terminates the flow. As described above, the image processing device 100 of this embodiment includes the display unit 150 and, when the communication unit 110 establishes a wireless connection with the terminal device 200 and then the generated two-dimensional code cannot be printed, the processing unit 120 performs processing of displaying the generated two-dimensional code on the display unit 150. By doing so, even in a situation where printing cannot be executed, the two-dimensional code can be output and the network setting page 130 can be displayed.

Although not illustrated in the flowchart, for example, the processing unit 120 may be configured to perform, as the first processing (Step S300) in the modified example of FIG. 17, the processing of printing the two-dimensional code (Step S330) only when the two-dimensional code cannot be displayed on the display unit 150. Herein, a case where the two-dimensional code cannot be displayed on the display unit 150 is a case where display data of the two-dimensional code cannot be output to the display unit 150, but includes a case where, although the display data of the two-dimensional code is output to the display unit 150, the user cannot recognize the two-dimensional code because backlight luminance is low or the like. For example, the image processing device 100 includes an unillustrated luminance sensor and can determine whether the two-dimensional code is displayed on the display unit 150 by determining whether a backlight luminance value equal to or higher than a predetermined luminance value has been detected from the luminance sensor. As has been described above, the image processing device 100 of this embodiment includes the display unit 150 and, when the communication unit 110 establishes a wireless connection with the terminal device 200 and then the generated two-dimensional code cannot be displayed on the display unit 150, the processing unit 120 performs the processing of printing the generated two-dimensional code. By doing so, the two-dimensional code can be output while use quantity of the print medium P is minimized.

The method of this embodiment is not limited to the foregoing. For example, the method described with reference to FIG. 14 or the like may be applied before the initial communication connection with the terminal device 200 is established. Specifically, for example, the processing unit 120 may be configured to perform, after NO is determined in Step S210 of FIG. 7, processing of outputting the two-dimensional code by the predetermined operation. The two-dimensional code includes information, such as, for example, the SSID of the internal access point 112, a password, or the like, and the terminal device 200 can acquire information of the internal access point 112 by reading the two-dimensional code by the reading unit 240. That is, in the image processing device 100 of this embodiment, the processing unit 120 performs processing of generating a two-dimensional code, based on the information of the internal access point 112, before the communication unit 110 establishes a wireless connection with the terminal device 200 via the internal access point 112 and processing of outputting the two-dimensional code. To connect the image processing device 100 with the terminal device 200 in an initial direct connection mode, it is required to install a predetermined application in the terminal device 200, and therefore, an inconvenience to a predetermined user occurs in some cases. The predetermined user is a user who does not desire to add an application to the terminal device 200 or the like. In this point, by applying the method of this embodiment, it is possible to connect the image processing device 100 with the terminal device 200 in a direct connection mode without installing the predetermined application. Furthermore, by applying the method illustrated in FIG. 7 or the like, network setting can be changed from the direct connection mode to the infrastructure more via the Web browser 230. In other words, by applying the method of this embodiment, connection of the image processing device 100 with the terminal device 200 in the infrastructure mode can be performed only by an easy work using a general-purpose software included in the terminal device 200. Even after connection of the image processing device 100 with the terminal device 200 in the infrastructure more is completed, setting of the image processing device 100 can be performed by the general-purpose software included in the terminal device 200. Thus, convenience of the image processing device 100 can be enhanced.

As has been described above, an image processing device according to this embodiment includes a communication unit that performs a wireless connection with a terminal device and a processing unit that generates a two-dimensional code including address information that specifies a network setting page used for performing network setting with the image processing device. The processing unit performs, when the communication unit establishes a wireless connection with the terminal device, processing of outputting the generated two-dimensional code.

As described above, in the image processing device of this embodiment, when the communication unit establishes a wireless connection with the terminal device, the processing unit performs the processing of outputting the generated two-dimensional code, so that the user can quickly display the network setting page. Thus, the user can perform detailed network setting for the image processing device and the terminal device quickly after the wireless connection has been established. Thus, convenience of the image processing device can be enhanced.

The communication unit may include an internal access point and the processing unit may be configured to output, when the communication unit establishes a wireless connection with the terminal device via the internal access point, the generated two-dimensional code.

By doing so, convenience of network setting after the wireless connection via the internal access point is established can be enhanced.

The processing unit may be configured to perform, when the communication unit establishes a wireless connection with the terminal device, processing of causing the terminal device to redirect to the network setting page and processing of outputting the generated two-dimensional code in parallel.

By doing so, regardless of a specification of the terminal device, necessary processing for displaying the network setting page can be more reliably performed.

The processing unit may be configured to perform, when the communication unit establishes a wireless connection with the terminal device, the processing of causing the terminal device to redirect to the network setting page and perform, when the terminal device cannot perform redirecting, processing of outputting the generated two-dimensional code.

By doing so, convenience of connection setting with the terminal device can be enhanced while output of the two-dimensional code is minimized.

The processing unit may be configured to perform, when the communication unit establishes a wireless connection with the terminal device, processing of printing the generated two-dimensional code.

By doing so, convenience when the wireless connection setting is performed and then the network setting page is displayed can be enhanced.

The network setting may be communication connection setting with an external access point.

By doing so, convenience of a system including the image processing device and the terminal device can be enhanced.

The processing unit may be configured to output, when, after a communication connection with the external access point is established, a predetermined operation is performed, the generated two-dimensional code again.

By doing so, the two-dimensional code can be output at a desired timing.

The processing unit may be configured to output, when, after a communication connection with the external access point is established, the predetermined operation is performed, the generated two-dimensional code again and output network status information.

By doing so, at a desired timing, the two-dimensional code can be output and also the network status information can be output.

The processing unit may be configured to perform, when, after a communication connection with the external access point is established, the predetermined operation is performed, processing of printing the generated two-dimensional code and the network status information.

By doing so, at a desired timing, the two-dimensional code can be printed and also the network status information can be efficiently grasped.

The processing unit may be configured to perform, when the communication unit establishes an initial wireless connection with the terminal device, the processing of outputting the generated two-dimensional code and not to perform, when the communication unit establishes a second or subsequent wireless connection, processing of outputting the two-dimensional code.

By doing so, when a power source is turned on, unnecessary output of the two-dimensional code can be prevented.

The image processing device may further include a display unit, and the processing unit may be configured to perform, when the communication unit establishes a wireless connection with the terminal device, the processing of printing the generated two-dimensional code and processing of displaying the generated two-dimensional code on the display unit in parallel.

By doing so, the two-dimensional code can be more reliably output.

The image processing device may further include a display unit, and the processing unit may be configured to perform, when the communication unit establishes a wireless connection with the terminal device and then the generated two-dimensional code cannot be printed, the processing of displaying the generated two-dimensional code on the display unit.

By doing so, even in a situation where printing cannot be executed, the two-dimensional code can be output and the network setting page can be displayed.

The image processing device may further include the display unit, and the processing unit may be configured to perform, when the communication unit establishes a wireless connection with the terminal device and then the generated two-dimensional code cannot be displayed on the display unit, the processing of printing the generated two-dimensional code.

By doing so, the two-dimensional code can be output while use quantity of a print medium is minimized.

A processing method according to this embodiment includes processing of performing a wireless connection with a terminal device, processing of generating a two-dimensional code including address information that specifies a network setting page used for performing network setting with an image processing device, and processing of outputting, when a wireless connection with the terminal device is established, the generated two-dimensional code.

A program according to this embodiment causes a computer to function as a communication unit that performs a wireless connection with a terminal device and a processing unit that generates a two-dimensional code including address information that specifies a network setting page used for performing network setting with an image processing device. The processing unit performs processing of outputting, when the communication unit establishes a wireless connection with the terminal device, the generated two-dimensional code.

Note that, although this embodiment has been described in detail above, a person skilled in the art can easily understand that many modifications that do not substantially depart from the novel matters and effects of this embodiment are possible. Accordingly, all such modifications are intended to be included within the scope of the present disclosure. For example, a term described at least once together with a different term having a broader meaning or the same meaning in the specification or the drawings can be replaced with the different term anywhere in the specification or the drawings. All combinations of this embodiment and the modifications are also included in the scope of the present disclosure. The configurations and operations of the image processing device, the processing method, the program, or the like are not limited to those described in this embodiment, and various modifications can be made.

What is claimed is:

1. An image processing device, comprising:
    circuitry that includes an internal access point, wherein the circuitry is configured to:
        establish a first wireless connection with a terminal device via the internal access point in a direct connection mode;
        generate a first two-dimensional code based on the established first wireless connection;
        output the first two-dimensional code to the terminal device based on the established first wireless connection, wherein
            the first two-dimensional code includes address information corresponding to a network setting page,
            the network setting page is displayable by a browser in the terminal device based on the output of the first two-dimensional code,
            the network setting page is for execution of a network setting with the image processing device, and
            the network setting page includes connection system information that specifies one of the direct connection mode or an infrastructure mode;
        change the direct connection mode to the infrastructure mode based on a user input;
        establish a second wireless connection with the terminal device via an external access point in the infrastructure mode,
        determine a specific user operation;
        generate a second two-dimensional code, based on the established second wireless connection with the terminal device via the external access point and the specific user operation; and
        output the second two-dimensional code, based on the established second wireless connection with the terminal device and the specific user operation.

2. The image processing device according to claim 1, wherein the circuitry is further configured to output, in a case where the terminal device cannot perform a redirect to the network setting page, the generated first two-dimensional code.

3. The image processing device according to claim 1, wherein the circuitry is further configured to control, in a case where the first wireless connection with the terminal device via the internal access point is established, printing of the generated first two-dimensional code.

4. The image processing device according to claim 1, wherein the circuitry is further configured to:
    output, after a communication connection with the external access point is established, and a predetermined operation is performed, the generated first two-dimensional code again; and
    output network status information.

5. The image processing device according to claim 1, wherein the circuitry is further configured to control, after a communication connection with the external access point is established, and a predetermined operation is performed, printing of the generated first two-dimensional code and network status information.

6. The image processing device according to claim 1, wherein the circuitry is further configured to not output, in a case where one of the second wireless connection or a subsequent wireless connection is established, the generated first two-dimensional code.

7. The image processing device according to claim 1, further comprising a display unit,
    wherein the circuitry is further configured to control, in a case where the first wireless connection with the terminal device via the internal access point is established, printing of the generated first two-dimensional code and display of the generated first two-dimensional code on the display unit in parallel.

8. The image processing device according to claim 1, further comprising a display unit,
    wherein the circuitry is further configured to control, in a case where the first wireless connection with the terminal device via the internal access point is established and the generated first two-dimensional code is not printable, display of the generated first two-dimensional code on the display unit.

9. The image processing device according to claim 1, further comprising a display unit,
    wherein the circuitry is further configured to control, in a case where the first wireless connection with the terminal device via the internal access point is established and the generated first two-dimensional code is not displayable on the display unit, printing of the generated first two-dimensional code.

10. A processing method, comprising:
    establishing a first wireless connection with a terminal device via an internal access point in a direct connection mode;
    generating a first two-dimensional code based on the established first wireless connection;
    outputting the first two-dimensional code to the terminal device based on the established first wireless connection, wherein
        the first two-dimensional code includes address information corresponding to a network setting page,
        the network setting page is displayable by a browser in the terminal device based on the output of the first two-dimensional code,
        the network setting page is for execution of performing a network setting with an image processing device, and
        the network setting page includes connection system information that specifies one of the direct connection mode or an infrastructure mode;
    changing the direct connection mode to the infrastructure mode based on a user input;
    establishing a second wireless connection with the terminal device via an external access point in the infrastructure mode, determining a specific user operation;

generating a second two-dimensional code, based on the established second wireless connection with the terminal device via the external access point and the specific user operation; and outputting the second two-dimensional code, based on the established second wireless connection with the terminal device via and the specific user operation.

11. A non-transitory computer-readable storage medium storing computer-executable instructions, which when executed by a computer, causes the computer to execute operations, the operations comprising:

establishing a first wireless connection with a terminal device via an internal access point in a direct connection mode;

generating a first two-dimensional code based on the established first wireless connection;

outputting the first two-dimensional code to the terminal device based on the established first wireless connection, wherein the first two-dimensional code includes address information corresponding to a network setting page, the network setting page is displayable by a browser in the terminal device based on the output of the first two-dimensional code, the network setting page is for execution of a network setting with an image processing device, and the network setting page includes connection system information that specifies one of the direct connection mode or an infrastructure mode;

changing the direct connection mode to the infrastructure mode based on a user input;

establishing a second wireless connection with the terminal device via an external access point in the infrastructure mode, determining a specific user operation;

generating a second two-dimensional code, based on the established second wireless connection with the terminal device via the external access point and the specific user operation; and outputting the second two-dimensional code, based on the established second wireless connection with the terminal device and the specific user operation.

* * * * *